United States Patent
Nashimoto et al.

(10) Patent No.: US 6,470,125 B1
(45) Date of Patent: Oct. 22, 2002

(54) OPTICAL DEVICE, DRIVING METHOD OF OPTICAL DEVICE AND MANUFACTURE OF OPTICAL DEVICE

(75) Inventors: Keiichi Nashimoto; Shigetoshi Nakamura; Takashi Morikawa, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/507,919

(22) Filed: Feb. 22, 2000

(30) Foreign Application Priority Data

Feb. 19, 1999 (JP) .......................................... 11-042299
Jun. 2, 1999 (JP) .......................................... 11-154980

(51) Int. Cl.⁷ ............................. G02B 6/10; G02F 1/295
(52) U.S. Cl. ............................ 385/122; 385/132; 385/9; 385/40
(58) Field of Search .......................... 385/129–132, 385/14, 122, 4, 8, 9, 16, 17, 40, 41, 45; 359/322, 323; 117/4, 7–9; 264/1, 24; 216/24

(56) References Cited

U.S. PATENT DOCUMENTS

| | | | |
|---|---|---|---|
| 4,172,630 A | * 10/1979 | Burns et al. ................... 385/16 |
| 4,840,816 A | * 6/1989 | Appleton et al. ............. 427/526 |
| 5,238,877 A | * 8/1993 | Russell ..................... 427/126.3 |
| 5,270,298 A | * 12/1993 | Ramesh ......................... 505/1 |
| 5,347,608 A | * 9/1994 | Nakamura et al. .......... 385/130 |
| 5,442,585 A | * 8/1995 | Eguchi et al. ............... 365/149 |
| 5,650,362 A | * 7/1997 | Nashimoto ................ 427/126.3 |
| 5,699,465 A | 12/1997 | Nakaya .......................... 385/41 |
| 5,732,177 A | * 3/1998 | Deacon et al. ............... 385/122 |
| 5,802,223 A | * 9/1998 | Nashimoto ...................... 385/8 |
| 6,055,342 A | * 4/2000 | Yi et al. ......................... 385/2 |
| 6,307,996 B1 | * 10/2001 | Nashimoto et al. .......... 385/130 |

FOREIGN PATENT DOCUMENTS

| | | |
|---|---|---|
| JP | B2-6-5350 | 1/1994 |
| JP | A-7-318986 | 12/1995 |

OTHER PUBLICATIONS

G.H. Jin et al. Reverse ridge, large profile of single mode PLZT film waveguide and its Mach–Zehnder E–O modulator. IEEE LEOS Annual Meeting 1998, vol. 2, pp. 79–80. Dec. 1998.*

H. Okayama et al., Ti: LiNbO₃ Digital Optical Switch Matrices, Electronics Letters, Apr. 1993, vol. 29, No. 9, pp. 765–766.

M. Koizumi et al., Semiconductor Optical Switches With Carrier Injection, Kogaku–Japanese Journal of Optics, vol. 24, No. 6, 1995, pp. 324–329 (June).

T. Watanabe et al., Polymeric Optical Waveguide Circuits Formed Using Silicone Resin, Journal of Lightwave Technology, vol. 16, No. 6, Jun. 1998, pp. 1049–1055.

T. Kainou, *Electro–Optical Device Using Electric Field Orientation Polymer*, O plus E, 1995, pp. 98–105 (May).

R. Moosburger et al., Digital Optical Switch Based On 'Oversized' Polymer Rib Waveguides, Electronics Letters, Mar. 1996, vol. 32, No. 6, pp. 544–545.

* cited by examiner

*Primary Examiner*—Rodney Bovernick
*Assistant Examiner*—Mike Stahl
(74) *Attorney, Agent, or Firm*—Oliff & Berridge, PLC

(57) ABSTRACT

An optical device assures high speed drive, excellent temperature stability, low drive voltage and small crosstalk and insertion loss. The optical device includes a single crystal substrate which is used as a conductive or semiconductive lower electrode, an epitaxial buffer layer consisting of an oxide provided on the single crystal substrate, an epitaxial optical waveguide layer with an oxide ferroelectric material having an electro-optic effect which is provided on the buffer layer and which has a channel optical waveguide of which an optical path is switched when a voltage is applied to the branching portion between an optical path for incident light and an optical path for outgoing light, and a couple of upper electrodes for applying a voltage to the branching portion of the channel optical waveguide.

35 Claims, 10 Drawing Sheets

OPTICAL DEVICE, DRIVING METHOD OF OPTICAL DEVICE AND MANUFACTURE OF OPTICAL DEVICE

BACKGROUND OF THE INVENTION

1. Field of the Invention

The present invention relates to a channel optical waveguide type optical device, driving method of the same optical device and manufacture of the same optical device which may be applied to switching of optical path such as an optical fiber and to an optical logical circuit and an optical memory and more specifically to an optical device, a matrix type optical device formed by arranging the plural optical devices, driving method of the same optical device and manufacture of the same optical device which may be driven with high response characteristic, low drive voltage, low crosstalk and low insertion loss and assures to maintain the constant characteristic by utilizing the hysteresis characteristic even under the condition that a voltage is not applied.

2. Description of the Related Art

An optical communication network is now being developed, from a point-to-point optical communication which is individually connecting nodes, to the Add_Drop Multiplexing optical communication which is realized between points and moreover to optical communication which is connecting among the plural nodes in direct with optical signal without conversion to an electrical signal. Therefore, development of various kinds of optical parts required for such communication such as optical branching/coupling device, optical multiplexing/demultiplexing device and optical switch or the like is very important and particularly a matrix type optical switch utilizing the plural optical switches (or optical gates) is one of the most important parts among various kinds of optical parts because it is used for switching the plural optical fibers depending on demands or for switching the fibers to assure the alternative route when a failure occurs in the network.

A type of optical switch can be sorted as a bulk type and optical waveguide type switches. A bulk type switch is used to switch the optical path by mechanically driving a prism, mirror or fiber or the like and has the merits in less dependence on wavelength and comparatively low loss but also has problems that switching speed is rather low, reduction in size is difficult, that structure is not suitable for matrix type arrangement and that assembling and adjusting process are rather complicated to result in considerable difficulty in mass production and cost reduction. The optical waveguide type switch has excellent merits in the switching speed, reduction in size and integration and mass production and therefore the optical waveguide type matrix optical switch is widely discussed.

The optical waveguide type matrix optical switch can roughly be sorted to two kinds of mode. In the first mode, a branching type channel optical waveguide for connecting an input port and output port is switched through combination of plural sets of the optical switches or optical gates based on a certain principle. In the second mode, an optical deflector is provided between the input port and output port to deflect the optical beam of input port toward the output port. In these modes, the optical waveguide type optical switch of the first mode is now discussed most widely from the viewpoint of flexibility of design and less amount of loss.

In the optical waveguide type optical switch, a channel optical waveguide is generally formed on $LiNbO_3$, compound semiconductor, quartz or polymer and an optical switch for electrically controlling the traveling direction of optical beam or an optical gate for electrically controlling the switching of traveling of optical beam is provided at the crossing areas of respective optical paths.

The optical waveguide type optical switch utilizing quartz or polymer has a merit that the core size can be set almost equal to the mode field diameter of an optical fiber and insertion loss can be set small because optical coupling efficiency from the optical fiber is good, but also has a problem that a response rate is rather slow because a current is applied to a heater provided at the surface of optical waveguide in order to switch the traveling direction of optical beam by changing refractive index due to the thermo—optical effect. For example, it is disclosed in the J. Lightwave Tech. 16(1998) 1049 by T. Watanabe et al. That the response rate is extended up to 6 ms. Moreover, this optical switch also has a problem that only one electrode requires the power consumption as much as several hundreds of mW and its application field is limited because the heating system by heater is employed.

In addition, an optical waveguide type optical switch formed of an organic non-linear optical material is also proposed. In general, the optical waveguide can be formed of an organic non-linear optical material by doping organic non-linear molecule into the polymer or by giving the non-linear structure to the side chain or main chain portion of polymer to attain the electric field alignment polymer to which poling has been conducted through application of electric field. However, as disclosed in the reference, O plus E, 186(1995), 98 by Kainoh, the electric field alignment polymer has a problem of temperature stability in comparison with the oxide ferroelectric material and development of an element which may be enough for practical use is not yet insufficient in current.

In the case of the optical waveguide type switch utilizing a compound semiconductor or quantum well, high speed response can be realized but it also has a problem, as disclosed in the reference Optoelectronics 24 (1995) 324 by Koizumi, that a core size is small and optical coupling efficiency from an optical fiber is rather bad and thereby insertion loss becomes large. Accordingly, various effects have been made for this optical waveguide type optical switch. Moreover, this optical switch has the problems that the switching characteristic is deteriorated because optical absorption is generated simultaneously with the switching by the electrical field application and that it is difficult to form a large size matrix optical switch because the wafer size is limited.

In the case of the $LiNbO_3$ which is the most typical optical switch material and is one of the oxide ferroelectric material, optical condition changes at a high speed when a voltage is applied to the electrode of optical switch because the refractive index changes due to the electro-optic effect and the traveling direction of optical beam changes depending on the setting of optical condition. Therefore, each optical switch is capable of selectively outputting the light beam from a couple of input ends to a couple of output ends. Accordingly, when the traveling direction of the optical beam is adequately set in each stage, the light beam from the input port can be sent to the desired output port.

Moreover, in an optical switch using $LiNbO_3$, a Ti diffusion type optical waveguide and a proton exchange type optical waveguide is formed to a single crystal wafer, but since the core size may be determined equal to the mode field diameter of an optical fiber and optical coupling efficiency from optical fiber is good, insertion loss becomes small. Accordingly, this optical switch is known as the optical switch for the level of practical use.

However, since a voltage is applied in the structure by providing a coplanar type electrode to the surface of optical waveguide, the distance between electrodes becomes long and an ideal field profile cannot be attained and the drive voltage as high as 40 volts is required in order to eliminate dependence on polarization disclosed, for example, in the Electron. Lett. 29 (1993) 765 by H. Okayama and M. Kawahara. Moreover, since the optical waveguide is formed by the Ti diffusion and proton exchange on the single crystal wafer, an effective refractive index of the channel optical waveguide cannot sufficiently be set higher than that of the peripheral area and therefore the difference of the refractive index cannot be set large. Accordingly, it is also required to assure the radius of curvature of S-shape channel optical waveguide as large as 50 mm and the size of the 8×8 matrix optical switch becomes as large as about 70 mm in the example by H. Okayama et. al.

The principle for switching the optical path of these optical switches can be represented by the method for controlling the optical path by applying an electric field to a directional coupler in which two optical waveguides are provided approximately, the Mach-Zehnder type method for isolating an input beam to a couple of beams with the directional coupler to give a phase difference to the light beams passing respective light paths with the refractive indices generated by the electric field and for switching the output end by controlling the interference condition in the directional coupler in the output side, the method for switching the optical path by controlling the interference between optical modes at the X crossing portion, the digital type method for switching the optical path by controlling distribution in the lateral direction of optical mode with the refractive index generated by the electric field in the Y branching portion or asymmetrical X crossing portion, and the method for switching the optical path through total reflection or Bragg reflection by controlling the refractive index through provision of the electrode at the X crossing portion. These methods are disclosed, for example, in the Electron. Lett. 29 (1993) 765 by H. Okayama and M. Kawahara, the Japanese Published Unexamined Patent Application No. Hei 7-318986 and the Japanese Published Examined Patent Application No. Hei 6-5350 or the like.

A digital type optical switch among these optical switches is called as a digital type because after the optical path is switched by a constant voltage, this condition is maintained even if higher voltage applied and plural operating points are never generated and this digital type optical switch is attracting particular attention because of the merits that it has excellent tolerance of operating voltage, that dependence on polarization can be eliminated and that dependence on wavelength is rather small. However, this digital type optical switch requires higher drive voltage or longer electrode length in comparison with the other optical switches.

In addition, as illustrated in FIG. 15, the Y branching type channel waveguide of the digital type optical switch is branched at the acute angle portion to form a branching portion 1. In the case of ideal shape, two channel waveguides are crossing in the angle under 1° and the width between channels becomes gradually narrow at the branching area 1 until it becomes zero. However, it is difficult in the patterning process by the photolithography to form the ideal shape because of the limitation of resolution and therefore the shape has to be dulled, as illustrated in FIG. 16, in which the end part of the acute angle portion is cut at the area where the distance between channels of the branching portion 1 becomes about 1.5 $\mu$m. Such deviation from the ideal shape does not cause serious influence on loss but causes serious influence on crosstalk. In the case where the opening angle of the Y branching portion is set to 0.5° and the refractive index of one branching waveguide is lowered by about 0.0008 through the electro-optic effect, crosstalk may be set to 20 dB or less in the ideal shape of FIG. 15 but in the case of the shape of FIG. 16, crosstalk is deteriorated up to about 12 dB and a larger change of refractive index, namely a large voltage application is required to attain the crosstalk of 20 dB.

Therefore, the reference, Electron. Lett., 32 (1996) 544 by R. Moosburger et al. proposes, as illustrated in FIG. 17 and FIG. 18, the method of manufacturing a digital type optical switch having the ideal shape by using a photomask 2 in which the acute angle portion of the branching portion 1 of the channel waveguide is dulled through utilization of the under etching effect during the wet etching of the Si substrate 3. However, this method has a problem that the under etching width becomes almost equal to the etching depth because the isotropic etching is generally performed and the channel depth cannot independently controlled and therefore the manufacturing tolerance becomes insufficient. Moreover, this method also has a large difficulty other than the manufacturing tolerance because it is known that etching is never performed easily in the oxide ferroelectric material which is a typical optical switch material. In addition, a problem on the manufacturing is also occurring not only in the branching portion of the Y branching type channel waveguide but also in the branching portion of the asymmetrical X crossing type channel waveguide.

As explained above, even in the case of using any material of $LiNbO_3$, compound semiconductor, quartz or polymer, it has been impossible to attain an optical waveguide type matrix optical switch which simultaneously satisfies the conditions of optical switch size, drive voltage (or drive current or power consumption), switching speed, crosstalk, insertion loss and temperature stability.

Moreover, a branching type optical switch of the related art, in which a channel optical waveguide is formed to $LiNbO_3$, compound semiconductor, quartz or polymer and an optical switch for electrically controlling the traveling direction of a light beam or an optical gate for electrically controlling the traveling of a light beam by the switching operation is provided at the crossing portion of each path, is always requested to continuously apply a voltage or current to maintain the switching condition and therefore an optical device having the memory effect has been desired from the point of view of new application field such as reduction of power consumption and optical logical circuit or the like.

SUMMARY OF THE INVENTION

The present invention has been proposed to overcome the problems of the related art explained above and it is therefore intended to provide an optical device which assures high speed drive, excellent temperature stability, low drive voltage and low crosstalk and insertion loss.

The present invention also provides a compact size optical device and a matrix type optical device which can use a large number of optical devices.

The present invention also provides a driving method of an optical device for obtaining the stable driving characteristic without any hysteresis and a driving method of an optical device for driving the device by storing the predetermined condition using the hysteresis.

The present invention also provides a method of manufacturing an optical device with good accuracy.

The inventors of the present invention has completed, as the result of investigation, the present invention by finding out the problems of the related art can be solved by the optical devices to be explained below.

The optical device of the present invention includes an epitaxial or single orientation optical waveguide layer which is formed of an oxide ferroelectric material having an electro-optic effect and allows formation of a channel optical waveguide and electrodes having an upper electrode and a lower electrode to apply a voltage to the channel optical waveguide.

Owing to this structure, since a voltage is applied to the channel optical waveguide from the upper and lower directions, the voltage can be applied more effectively in comparison with the case where the voltage is applied from the adjacent electrodes at the upper area of the channel optical waveguide of the related art.

The other optical device of the present invention is characterized in that an oxide ferroelectric material is a non-linear material which shows hysteresis in the change characteristic of refractive index for a voltage and has different characteristics when the voltage is reduced to zero after the single polarity voltage is applied to the channel optical waveguide and when the voltage is reduced to zero after the voltage of the inverse polarity to the single polarity voltage is applied to the channel optical waveguide.

The characteristic can be maintained in the drive of the optical device between the channels even when the optical device is isolated from the power source by giving different characteristics to the channels under the zero voltage condition by utilizing the hysteresis characteristic. Therefore, not only application as a memory using such function is enabled but also power consumption required for drive of the optical device can be remarkably reduced.

Moreover, the other optical device of the present invention includes a single crystal substrate which is used as a conductive or semiconductive lower electrode or a single crystal substrate on whose surface a conductive or semiconductive thin film is provided as a lower electrode, an epitaxial or single orientation buffer layer formed of an oxide provided on the single crystal substrate, an epitaxial or single orientation optical waveguide layer formed of an oxide ferroelectric material having an electro-optic effect which is provided on the buffer layer and has formed a channel optical waveguide of which an optical path is switched when a voltage is applied to a branching portion of an optical path for incident light and an optical path for outgoing light and a couple of upper electrodes for applying a voltage to the branching portion of the channel optical waveguide.

With the arrangement explained above, it is possible to introduce the structure that the optical waveguide formed of an oxide ferroelectric material is sandwiched by the upper and lower electrodes to realize a low drive voltage without deteriorating the low optical transmission loss characteristic and thereby it is also possible to form a small size optical device by remarkably shortening the length of each electrode required to form the optical device through reduction of low drive voltage.

Moreover, since an optical switch is manufactured by growth of a buffer layer, an optical waveguide layer and a clad layer on the substrate, the refractive indices and thicknesses of the substrate, buffer layer, optical waveguide layer and clad layer can be selected respectively unlike those of the existing material. For instance, when $Pb(Zr_xTi_{1-x})O_3$ (0<x<1.0) is used as the buffer layer, optical waveguide layer and clad layer, a refractive index for the wavelength of 0.633 μm can be selected depending on the composition for the wider range from about 2.45 to 2.70 and mutual crystal matching is also excellent.

The other optical device of the present invention is characterized in that the optical waveguide layer has a refractive index which is larger than that of the buffer layer.

When transparency of a conductive substrate is low, if a light beam is guided to the optical waveguide provided on the substrate, a part of total light intensity penetrates to the substrate and the element penetrated to the substrate is absorbed because the transparency of substrate is low and transmission loss is generated by transmission of optical beam. However, as illustrated in FIG. 19, if the area in which the light beam is penetrated is replaced with a buffer layer 4 having the refractive index which is lower than that of the optical waveguide layer material, the buffer layer 4 functions as an isolating layer for isolating the optical waveguide layer 6 and conductive substrate 3. Thereby, the light beam is never absorbed by the conductive substrate 3 and transmission loss can therefore be reduced.

The other optical device of the present invention is characterized that a clad layer which is formed of an oxide and has a refractive index which is smaller than that of the optical waveguide layer is provided between the optical waveguide layer and upper electrode.

When an upper metal electrode is provided on the optical waveguide layer, if the lightwave frequency in the optical waveguide layer exceeds the plasma frequency of a metal electrode, the element penetrating to the metal electrode due to the optical transmission is intensively absorbed by the carrier in the metal, resulting in transmission loss. However, as illustrated in FIG. 19, when the area where the light beam is penetrated is replaced with a clad layer 7 having the refractive index which is lower than that of the optical waveguide layer material, the clad layer 7 functions as an isolating layer for isolating the optical waveguide layer 5 and metal electrode 8. Thereby the light beam is never absorbed by the upper metal electrode and transmission loss can be reduced.

The other optical device of the present invention is characterized in that this device is a digital type optical switch in which the channel optical waveguide is an X branching type optical waveguide and the upper electrode is a digital type switch provided to control switching of the optical path with a voltage applied to the branching portion.

The digital type optical device has excellent merits that after the optical path is switched with a constant voltage, that this condition is maintained even if a higher voltage is applied and the plural operating points are never generated, that tolerance of operating voltage is excellent, and that dependence on polarization can be eliminated and dependence on wavelength is rather small, etc.

The other optical device of the present invention is characterized in that the device is formed as a total reflection type switch or Bragg reflection type switch wherein the channel optical waveguide is the X crossing type optical waveguide and the upper electrode is provided to control the switching of the optical path with application of a voltage to the branching portion.

The matrix optical device of the present invention is characterized in that the branching portions of the optical devices are arranged in the form of a matrix on the same substrate and the optical path is switched from a desired optical path for incident light among the plural output optical paths to a desired input optical path among the plural input paths for outgoing light.

Since the ports having the adequate interval can be switched with a low drive voltage and the electrode length and bending channel optical waveguide length can also be shorted as required, a larger scale matrix optical device can be formed on the substrate wafer of the identical size as the existing substrate.

The driving method of an optical device of the present invention is a method for driving the optical device explained above and is characterized in that after the single pole initial voltage is applied to the channel optical waveguide from the upper electrode, and a voltage of the same polarity as the initial voltage is applied for the driving purpose.

By applying such an initial voltage, operation of optical device in which hysteresis is never generated can be realized.

The other optical device driving method of the present invention is further characterized in that the initial voltage which is enough to give electric field higher than the coercive electric field is applied to the channel optical waveguide.

Particularly, when the initial voltage which gives the electric field higher than the coercive electric field is applied, the hysteresis characteristic can be eliminated almost perfectly.

The other optical device driving method of the present invention is a method for driving the optical device explained above and is characterized in that the drive is driven by utilizing the first characteristic obtained when a single polar voltage is applied to the channel optical waveguide and this voltage is thereafter reduced to zero and the second characteristic different from the first characteristic when a voltage of inverse polarity inverted to the single polar voltage is applied to the channel optical waveguide and this voltage is thereafter reduced to zero.

In the other optical device driving method of the present invention, even if a voltage is not applied, the conditions which are required for driving the optical device may be maintained by giving the first characteristic to one channel and the second characteristic to the other channel.

The manufacturing method of an optical device of the present invention is a method for manufacturing an optical device including an epitaxial or single orientation optical waveguide layer which is formed on an oxide ferroelectric material having an electro-optic effect and has formed a channel optical waveguide and an electrode having an upper and a lower electrodes for applying a voltage to the channel optical waveguide. This manufacturing method is characterized in that the optical waveguide layer is formed through solid phase epitaxial growth by heating an amorphous thin film.

In the case of the patterning of a polycrystal thin film by a similar method, an edge, a side wall and a surface are formed roughly due to the uneven areas by random crystal grains but in the case of using solid phase epitaxial growth, the patterned amorphous thin film is formed by solid phase epitaxial growth and therefore the channel optical waveguide having smooth side wall and surface and showing less amount of optical loss due to the scattering can easily be formed.

The other optical device manufacturing method of the present invention is an optical device manufacturing method explained above and is characterized in that the etching is wet etching.

In the patterning process by the photolithography, it is difficult to form the ideal shape, from the limitation of resolution, for the acute angle portion of the crossing portions of the channel waveguide at the Y branching or asymmetrical X crossing portion and here rises a problem that the crosstalk is deteriorated. However, an ideal shape can be formed with good control ability and accordingly the crosstalk can be improved by combining solid phase epitaxial growth with wet etching.

The other optical device manufacturing method of the present invention is an optical device manufacturing method explained above and is characterized in that the amorphous thin film is formed by coating of an organic metal compound solution. Solid phase epitaxial growth utilizing coating and of organic metal compound solution and heat treatment thereof provides the effect for flattening the surface including the level different portion.

The other optical device manufacturing method of the present invention is an optical device manufacturing method explained above and is characterized in manufacturing an optical device by applying, to the formed channel optical waveguide, an initial voltage in such an amplitude as giving the electric field higher than the coercive electric field.

When the initial voltage which is enough for giving the electric field higher than the coercive electric field is applied, the changing characteristic of the refractive index of the oxide ferroelectric material for the applied voltage does not show any hysteresis and this character becomes the linear characteristic and thereby an optical device which assures stable drive can be manufactured.

In the other optical device manufacturing method of the present invention, after an amorphous buffer layer having an amorphous thin film is formed, a part which becomes the channel optical waveguide of the amorphous buffer layer is removed by etching process, thereafter an epitaxial or single orientation buffer layer is formed through solid phase epitaxial growth by heating the amorphous buffer layer, an amorphous optical waveguide layer having the amorphous thin film of an oxide ferroelectric material having the electro-optic effect is formed on an epitaxial or single orientation buffer layer and the epitaxial or single orientation optical waveguide layer is formed through solid phase epitaxial growth by heating the amorphous optical waveguide layer.

Thereby, a channel waveguide having higher accuracy may be formed with higher productivity even when the oxide ferroelectric material is used for which there is no effective method to form the conventional projected or recessed optical waveguide.

Here, on the occasion of forming the channel waveguide by etching the optical waveguide layer using the oxide ferroelectric material, the optical waveguide is formed with an amorphous thin film and it is then etched to form the channel waveguide. Therefore, higher accuracy and higher productivity can be realized even in the case of solid phase epitaxial growth.

The other optical device of the present invention is characterized in that it is provided with an epitaxial or single orientation optical waveguide layer formed of an oxide ferroelectric material having an electro-optic effect and has formed a channel optical waveguide and an electrode for applying a voltage to the channel optical waveguide wherein the oxide ferroelectric material is a non-linear material which shows a hysteresis characteristic in its changing of the refractive index for the voltage and has different characteristics when a single polarity voltage is applied to the channel optical waveguide and the voltage is thereafter reduced to zero and when a voltage of inverse polarity to the single polarity voltage is applied to the channel optical waveguide and thereafter it is reduced to zero. Therefore, a change of the refractive index can be stored even under the non-electric field condition and accordingly an optical device which may be used as a new type memory device with lower power consumption can be obtained.

In the present invention, "single orientation" means the characteristic in which crystal orientation is aligned in one direction at least by the θ–2θ X-ray diffraction pattern, namely the random orientation plane is identified as 1% or less of the diffraction intensity of the single orientation plane.

BRIEF DESCRIPTION OF THE DRAWINGS

Preferred embodiments of the present invention will be described in detail based on the following drawings, wherein.

DETAILED DESCRIPTION OF THE PREFERRED EMBODIMENTS

First Embodiment

Figure 1:
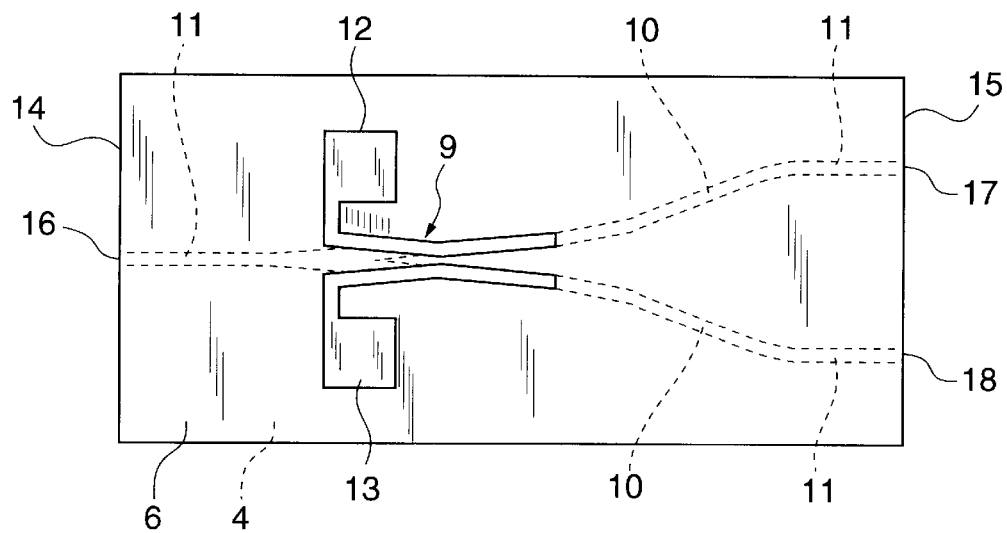
FIG. 1 is a plan view of the Y branching type 1×2 optical switch as the first embodiment of the present invention.
Figure 2:
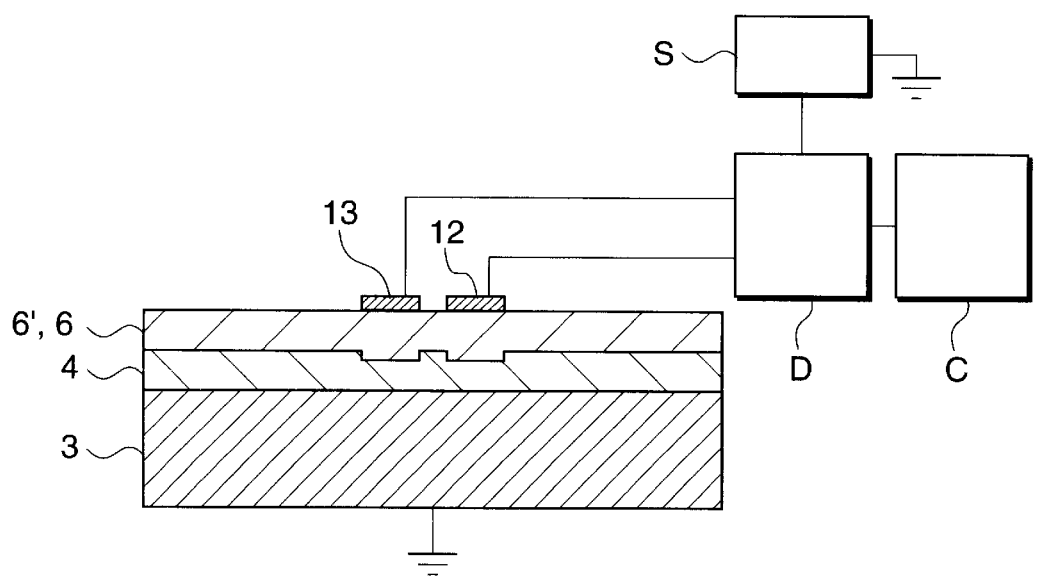
FIG. 2 is a cross-sectional view of the Y branching type 1×2 optical switch as the first embodiment of the present invention.

FIG. 1 is a plan view of the Y branching type 1×2 optical switch as the first embodiment of the present invention and FIG. 2 is a cross-sectional view at its branching portion.

As illustrated in FIG. 1, an optical switch as the first embodiment of the present invention has an incident end surface 14 and a outgoing end surface 15. The incident end surface 14 is provided with one incident port 16, while the outgoing end surface 15 is provided with a couple of leaving ports 17 and 18. These incident port 16 and two leaving ports 17, 18 are joined at the Y branching portion 9 by the S-shape channel waveguide 10 and linear channel waveguide 11. Moreover, as illustrated in FIG. 2, in the optical switch of the first embodiment, an epitaxial buffer layer 4 including PZT in the composition having the refractive index of 2.415 for the wavelength of 1.3 μm (hereinafter, refractive index means that for the wavelength of 1.3 μm) and an epitaxial or single orientation optical waveguide layer 6 including PZT of the composition having the refractive index of 2.477 are laminated in this sequence on the substrate 3 having Nb doped $SrTiO_3$ (100) single crystal semiconductor which will becomes the lower electrode. Within the epitaxial optical waveguide layer 6, the channel optical waveguides 10, 11 explained above are formed, while on the epitaxial or single orientation optical waveguide layer 6, an Al thin film for applying a voltage to the Y branching portion 9 and upper electrodes 12, 13 having ITO thin film are provided. The upper electrodes 12, 13 are connected to the power supply S via a drive circuit D connected to a control circuit C, while the substrate 3 which becomes the lower electrode and power supply S are grounded. In the subsequent embodiments, illustration of drive circuit D, control circuit C and power supply S is omitted.

Next, an optical switch manufacturing method in relation to the first embodiment will be explained. Lead acetic anhydride $Pb(CH_3COO)_2$, zirconium isopropoxyde $Zr(O-i-C_3H_7)_4$ and titanium isopropoxyde $Ti(O-i-C_3H_7)_4$ are dissolved to 2-methoxyethanol as the starting raw materials. Thereafter, this fluid is distilled and refluxed. Finally, the precursor solution for PZT buffer layer in the Pb concentration of 0.6M has been obtained.

This precursor solution for buffer layer is spin-coated on the Nb doped $SrTiO_3$ (100) single crystal substrate 3 which has been washed, etched and dried up. This single crystal substrate 3 is heated up to 350° C. in the $O_2$ atmosphere and then maintained under the temperature of 650° C. and thereafter it is cooled. Solid phase epitaxial growth has been attempted by repeating such a temperature cycle and thereby the PZT epitaxial buffer layer 4 in the composition of refractive index of 2.415 has been formed in the thickness of 1200 nm.

Next, the precursor solution for PZT buffer layer is spin-coated on the PZT epitaxial buffer layer 4 and it is then heated up to 350° C. and is then maintained in the $O_2$ atmosphere and thereafter it is cooled. The PZT amorphous buffer layer 5 has been formed in the thickness of 230 nm by repeating this temperature cycle.

Figure 3:
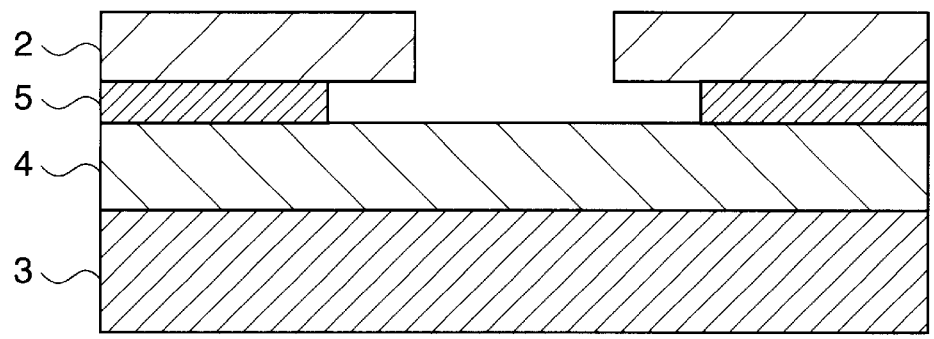
FIG. 3 is a cross-sectional view illustrating progress of wet etching in the case where an amorphous thin film is formed on the surface of epitaxial thin film.
Figure 18:
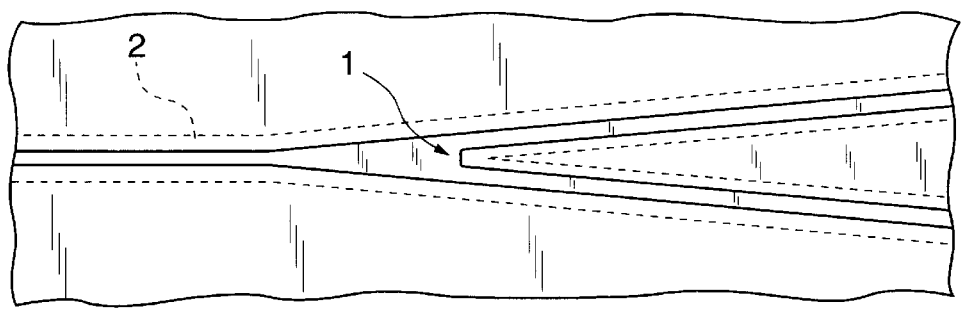
FIG. 18 is a diagram for explaining the patterning method of the Y branching portion in the Y branching type channel waveguide of the digital type optical switch utilizing the under etching effect during the wet etching process.
Figure 19:
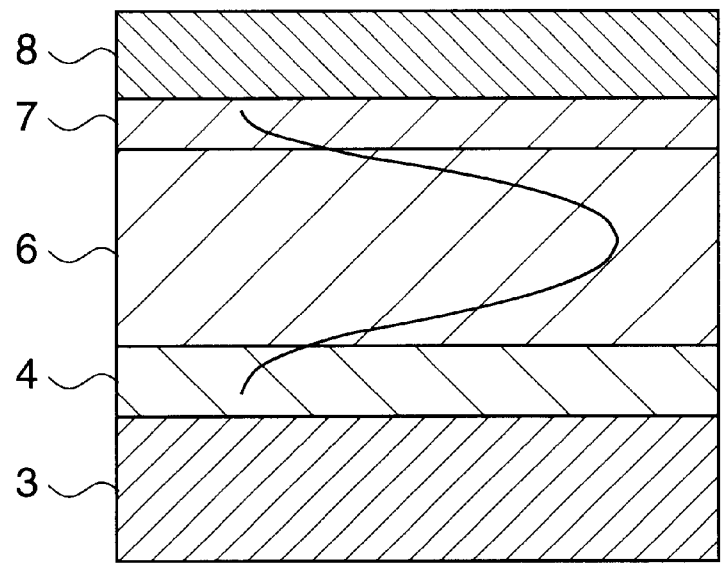
FIG. 19 is a principle diagram illustrating electric field distribution of the optical switch of the present invention.

Next, the photoresist is spin-coated and then pre-baked. Thereafter, the photoresist has been exposed and developed. Thereby, a resist pattern 2 having an aperture in the shape of 3.5 μm has been formed, in which the acute angle portion of the Y branching portion of the channel waveguide as illustrate in FIG. 18 is dulled. After the post-baking, a part of the PZT amorphous buffer layer 5 has been removed by wet etching thereof by the aqueous solution of HCl. As illustrated in FIG. 3, etching in the depth direction of channel is stopped when it reaches the epitaxial buffer layer 4 but since the PZT amorphous buffer layer 5 under the mask is underetched or side-etched in the width direction of channel, the etching has been stopped at the time when width of etching becomes 5.0 μm which is wider than the resist pattern 2. Since the depth and width of channel can independently controlled as explained above, the acute angle portion of the crossing portion of Y branching can be processed with higher accuracy in the ideal shape. Here, the etching rate is roughly set to the range from 0.1 μm/min to 0.5 μm/min.

As explained above, the Y branching portion 9 in the opening angle of 0.5°, S-shaped channel waveguide 10 having the radius of curvature of 9 mm resulting in the radiation loss in the level which may be neglected and linear channel waveguide 11 which are illustrated in FIG. 1 have been processed as the recessed groove in the height of 230 nm and width of 5.0 μm.

Next, after the resist is peeled by a remover, the PZT amorphous optical waveguide layer 6' in the composition having the refractive index of 2.477 after the epitaxial growth is formed in the thickness of 230 nm by spin-coating, to the surface, the precursor solution for PZT optical waveguide layer adjusted in the same manner as the precursor solution for PZT buffer layer, then heating the surface up to 350° C. in the $O_2$ atmosphere and maintaining this temperature and thereafter cooling the surface. Thereafter, the surface is heated up to 650° C. for solid phase epitaxial growth of the PZT amorphous buffer layer 5 having the linear pattern and PZT amorphous optical waveguide layer 6'.

In addition, the precursor solution for PZT optical waveguide layer is spin-coated at the surface, it is then heated and maintained at 350° C. under the $O_2$ atmosphere and it is then maintained at 650° C. and thereafter the surface has been cooled. Solid phase epitaxial growth has been performed by repeating this temperature cycle and thereby the PZT epitaxial optical waveguide layer 6 in the composition having the refractive index of 2.477 has been formed in the thickness of 1370 nm. Repetition of solid phase epitaxial growth as explained above is more desirable from the viewpoint of crystal quality than solid phase epitaxial growth of the amorphous layer at a time, but the present invention is never limited to such repetition and such solid phase epitaxial growth may be repeated as required.

After a laminated thin film having Al in the thickness of 200 nm and ITO in the thickness of 200 nm is formed by the sputtering method on the PZT epitaxial optical waveguide layer 6 of the Y branching portion 9, the upper electrodes 12 and 13 in the shape having the width of 5 μm and length of 2000 μm as illustrated in FIG. 1 is formed by the lift-off method to manufacture the single mode 1×2 optical switch. The incident end surface 14 and outgoing end surface 15 have been formed by the polishing process.

The crystallographical relationship of each laminated layer is the single orientation PZT(100) optical waveguide layer //PZT(100) buffer layer//Nb—$SrTiO_3$ (100) substrate and in—plane orientation PZT [001] optical waveguide layer//PZT[001] buffer layer//Nb—$SrTiO_3$ [001] substrate.

The electro-optic coefficient r obtained of the PZT optical waveguide layer has been 50 pm/V. The effective voltage of the PZT optical waveguide layer obtained from the relative dielectric coefficient 600 of the PZT buffer layer and the relative dielectric coefficient 900 of the PZT optical waveguide layer becomes 47% and therefore a voltage can be applied in the higher efficiency even via the buffer layer and clad layer. When the single mode optical fiber is arranged at the incident end surface 14 and outgoing end surface 15 of this optical switch and the laser beam in the wavelength of 1.3 μm is guided to the incident port 16 of the incident end surface 14 of the 1×2 optical switch of this embodiment, the laser beam is branched to two channels in the intensity of 3 dB(50%) at the Y branching portion 9 and the laser beam is distributed in the equal intensity to a couple of optical fibers of the leaving ports 17 and 18 of the outgoing end surface 15.

In this case, when a voltage is applied across the lower Nb doped $SrTiO_3$ substrate electrode 3 and any one of the two upper electrodes 12 or 13, refractive index of the optical waveguide across the electrodes changes.

Figure 21:
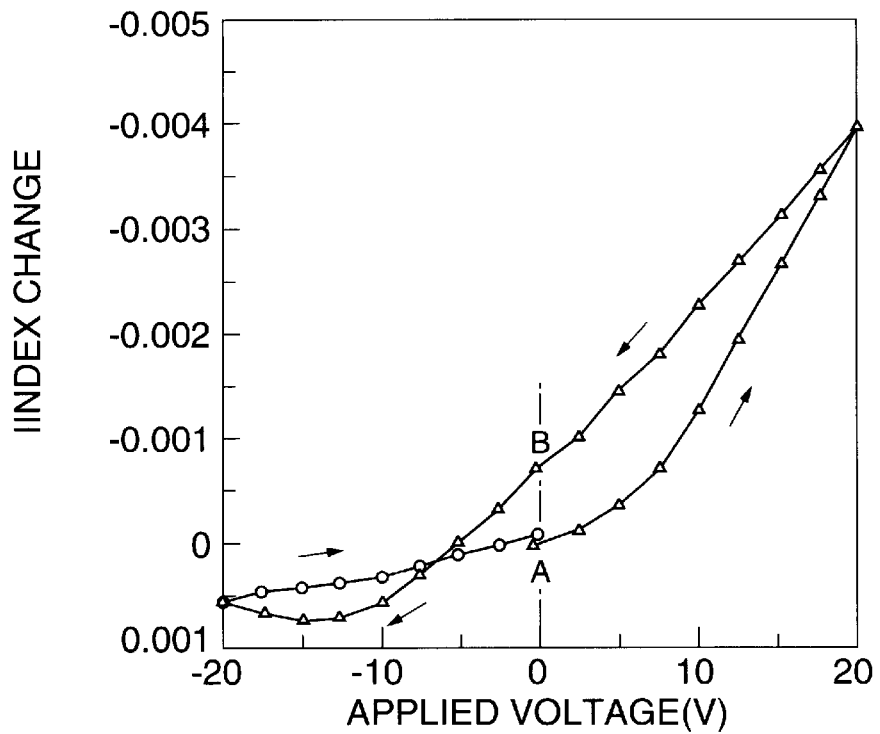
FIG. 21 is a graph showing changes of the refractive index of the oxide ferroelectric material forming an optical waveguide layer for the voltage applied to the optical waveguide in the laminated structure similar to that of the optical switch as the first embodiment of the present invention.

FIG. 21 shows the result of measurement of changes of refractive index, for the applied voltage, of an oxide ferroelectric material forming the optical waveguide layer in the laminated structure similar to the optical switch of this embodiment.

When the a voltage being applied is gradually increased from 0V to make positive the upper electrode, a refractive index is gradually lowered. When the voltage reaches 20V and it is then gradually reduced, a refractive index is increased. When the voltage returns to 0V and it is then lower voltage is applied from 0V to make negative the upper electrode, a refractive index gradually increases. The refractive index is lowered gradually from about −15 and if the voltage is increased from −20V when the voltage reaches −20V, the refractive index is further lowered and then returns to the initial refractive index.

As explained above, the oxide ferroelectric material forming the optical waveguide layer shows hysteresis in its changing characteristic of refractive index for the voltage to be applied and this changing characteristic is non-linear and asymmetrical for zero voltage. The reason why the refractive index changing characteristic shows hysteresis is considered that polarization domain of the optical waveguide layer moves depending on the condition of electric field and thereby electro-optic coefficient tensor element of the optical waveguide layer also changes.

Meanwhile, after the applied voltage is gradually increased up to 20V from 0V to give the electric field higher than the coercive electric field to the optical waveguide layer, the applied voltage is lowered to 0V from 20V. After completion of the above manipulation, a voltage is increased gradually from 0V to make positive the upper electrode and when the voltage reaches 20V, it is then gradually reduced from 20V until it returns to 0V. During this period, changes of the refractive index of oxide ferroelectric material for the applied voltage has been measured.

Figure 22:
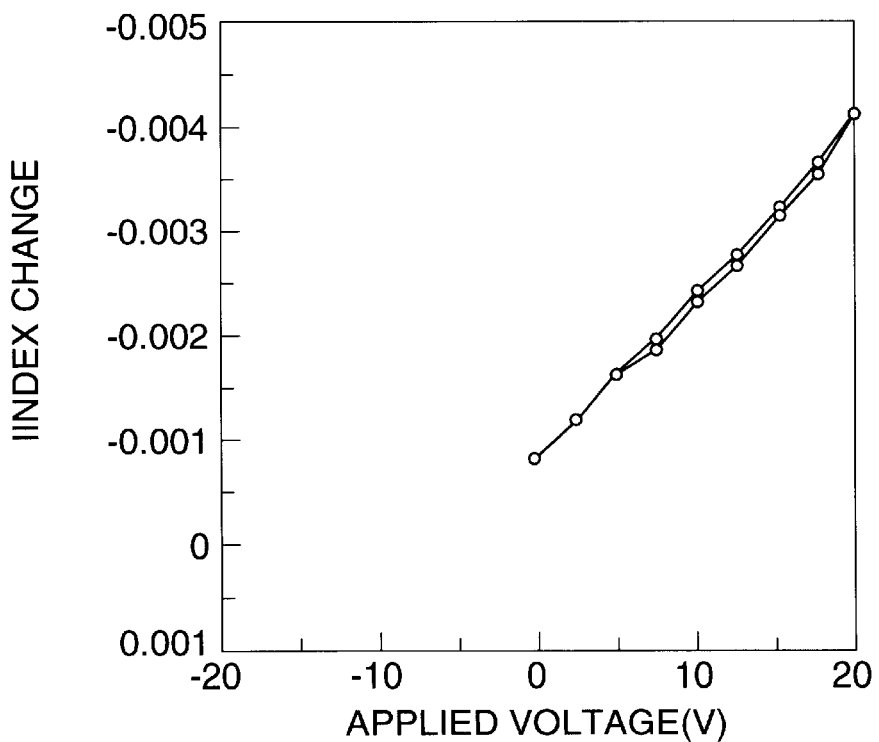
FIG. 22 is a graph showing changes of the refractive index of the oxide ferroelectric material forming an optical waveguide layer for the voltage applied to the optical waveguide after application of the voltage of +20V in the laminated structure similar to that of the optical switch as the first embodiment of the present invention.

As a result, as illustrated in FIG. 22, the changing characteristic does not show any hysteresis and has become linear. The reason is considered that the polarization domain of the optical waveguide layer is aligned in one direction because the electric field higher than the coercive electric field is applied and thereby the particular electro-optic coefficient tensor element of the optical waveguide layer is stabilized and thereby change of refractive index does not show any hysteresis.

Next, an optical switch driving method of this embodiment will be explained.

First, in the case where the optical switch of this embodiment is driven without utilization of hysteresis characteristic, a positive pulse voltage of 20V is applied as the initial voltage across the lower Nb doped $SrTiO_3$ substrate electrode 3 and two upper electrodes. Thereby, the electric field higher than coercive electric field is given to the optical waveguide layer and the hysteresis characteristic of the oxide ferroelectric material is lost. It is also possible to impress in advance the initial voltage at the time of manufacturing the optical switch as in the case of manufacturing an optical switch by applying the coercive electric field as will be explained later.

In order to turn ON the channel in the side of electrode 13 of this optical switch, a voltage is never applied across the lower Nb doped $SrTiO_3$ substrate electrode 3 and any one electrode 13 of the two upper electrodes but a positive voltage, for example, 5V voltage is applied across the lower Nb doped $SrTiO_3$ substrate electrode 3 and the electrode 12. Thereby, the refractive index of the optical waveguide under the electrode 12 is lowered stably, the channel in the side of electrode 13 turns ON and the laser beam guided from the incident end surface 14 is output from the outgoing end surface 18 of the Y branching portion 9 passing the channel under the electrode 13 in which refractive index is not lowered because a voltage is not applied.

On the contrary, the channel in the side of electrode 12 of this optical switch can be turned ON by applying the positive voltage, for example, of 5V across the lower Nb doped $SrTiO_3$ substrate electrode 3 and the electrode 13 without application of voltage across the lower Nb doped $SrTiO_3$ substrate electrode 3 and one electrode 12 of two upper electrodes.

An example of the switching through application of a voltage to the any one of the upper electrodes has been explained above but it is also possible to impress a voltage across both upper electrodes to generate the predetermined potential difference. In this case, the upper electrode side in the lower voltage side is turned ON.

Meanwhile, in order to drive the optical switch of this embodiment by utilizing the hysteresis characteristic, a couple of conditions A, B in which the channel in the side of electrode 12 is different from the channel in the side of electrode 13 in the zero potential condition are considered and there exists the difference of refractive indices required for the switching in two values of refractive index (characteristic) in such two conditions.

In order to turn ON the side of electrode 13, the voltage is applied so that the channel in the side of electrode 13 becomes the condition A when the channel in the side of electrode 12 is in the condition B. On the other hand, in order to turn ON the side of electrode 12, when the channel in the side of electrode 12 is in the condition A, a voltage is applied so that the channel in the side of electrode 13 is in the condition B.

The initial condition where a voltage is not applied is the condition A and a positive pulse voltage of 20V, for example, is applied as the initial voltage across the lower Nb doped $SrTiO_3$ substrate electrode 3 and two upper electrodes. Thereby, if the voltage becomes zero, the channel under both electrodes is set to the condition B illustrated in FIG. 21. Next, a negative pulse voltage of 20V, for example, is applied as the switching voltage across the lower Nb doped $SrTiO_3$ substrate electrode 3 and the upper electrode 13 to drive the switching operation. Thereby, the refractive index increases and the channel in the side of electrode 13 is set to the condition A illustrated in FIG. 21 for the zero voltage.

When the laser beam is incident under this condition, the laser beam guided from the incident end surface 14 selects and passes the channel in the side of electrode 13 having a higher refractive index at the Y branching portion 9. Namely, even if the power supply is turned OFF, the ON condition of electrode 13 is maintained and the switching of optical fiber path of the digital type switch can be realized.

Owing to the structure explained above and driving method for applying a voltage higher than the coercive electric field, the optical switch of the first embodiment does not show hysteresis characteristic and requires, in the ordinary drive, the drive voltage of only 5V which is equal to $\frac{1}{10}$ the voltage in the related art in comparison with the 1×2 optical switch structured by the method of the present invention even when the total length is as short as about 6 mm. Moreover, utilization of the hysteresis characteristic enables the switching operation including the memory function for maintaining the switching condition even if no voltage is applied. In this switching operation, the switching frequency has been 100 MHz or higher, crosstalk has been 20 dB or less and insertion loss has been 5 dB or less and moreover the good characteristic not depending on polarization has also been obtained.

Second Embodiment

Figure 4:
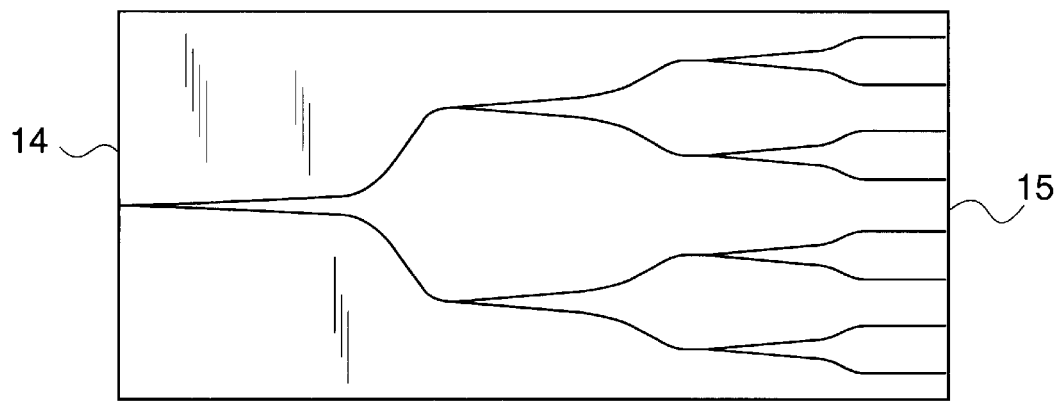
FIG. 4 is a plan view of a 1×8 optical switch as the second embodiment of the present invention.
Figure 5:
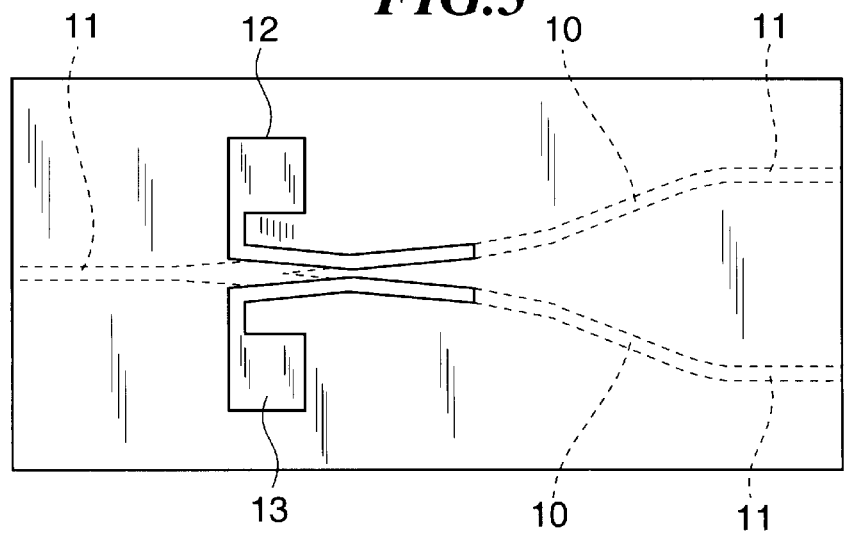
FIG. 5 is an enlarged view of the branching portion of the 1×8 optical switch as the second embodiment of the present invention.

FIG. 4 is a plan view of the 1×8 optical switch of the second embodiment of the present invention and FIG. 5 is an enlarged view of the branching portion. The cross-sectional view at each branching portion is identical to that of the first embodiment illustrated in FIG. 2.

The 1×8 optical switch of the second embodiment of the present invention is, as illustrated in FIG. 4, the single mode digital type 1×8 optical switch combining in three stages the 1×2 optical switch of the first embodiment.

Next, the method of manufacturing the optical switch of the second embodiment of the present invention will be explained. Like the optical switch of the first embodiment, the PZT epitaxial buffer layer 4 of the composition having the refractive index of 2.415 is formed in the thickness of 1200 nm by solid phase epitaxial growth on the substrate 3 having the Nb doped $SrTiO_3$ (100) single crystal semiconductor which becomes the lower electrode.

Next, after the PZT amorphous buffer layer 5 of the composition having the refractive index of 2.415 after the epitaxial growth is formed on the PZT epitaxial buffer layer 4 in the thickness of 230 nm, a part of the PZT amorphous buffer layer 5 is removed by the wet etching using the HCl aqueous solution by the method similar to that illustrated in FIG. 3. Regarding each 1×2 optical switch, after the Y branching portion 9 having an opening angle of 0.5°, the S-shape channel optical waveguide 10 having the radius of curvature of 9 mm resulting in the radiation loss of the level which may be neglected and the linear channel waveguide 11 are processed the recessed groove in height of 230 nm and width of 5.0 pm, the PZT amorphous buffer layer 5 is grown by solid phase epitaxial growth method to become the PZT epitaxial buffer layer 4.

The radius of curvature of the S-shape channel optical waveguide assures designing, in wider range, the difference between the effective refractive index of the channel optical waveguide and the effective refractive index of the peripheral area thereof by changing materials of substrate, buffer layer and optical waveguide and shape of the channel. Therefore, the value can further be reduced as required and thereby a size of optical switch may also be reduced.

Next, the PZT epitaxial optical waveguide 6 in the composition having refractive index of 2.477 is formed on the PZT epitaxial buffer layer 4 in the thickness of 1600 nm by solid phase epitaxial growth.

After a laminated thin film having Al in the thickness of 200 nm and ITO in the thickness of 400 nm is formed by the sputtering method on the PZT epitaxial optical waveguide layer 5 of the Y branching portion 9, the upper electrodes 12, 13 having the shape in the width of 5 $\mu$m and length of 2000$\mu$m illustrated in FIG. 5 are formed for each 1×2 optical switch by the lift-off method to form the single mode digital type 1×8 optical switch having three stages of 1×2 optical switch illustrated in FIG. 4.

At the incident end surface 14 of this optical switch, one single mode optical fiber is arranged and eight single mode optical fibers are arranged at the outgoing end surface 15 with an interval of 250 $\mu$m to form an array.

Figure 6:
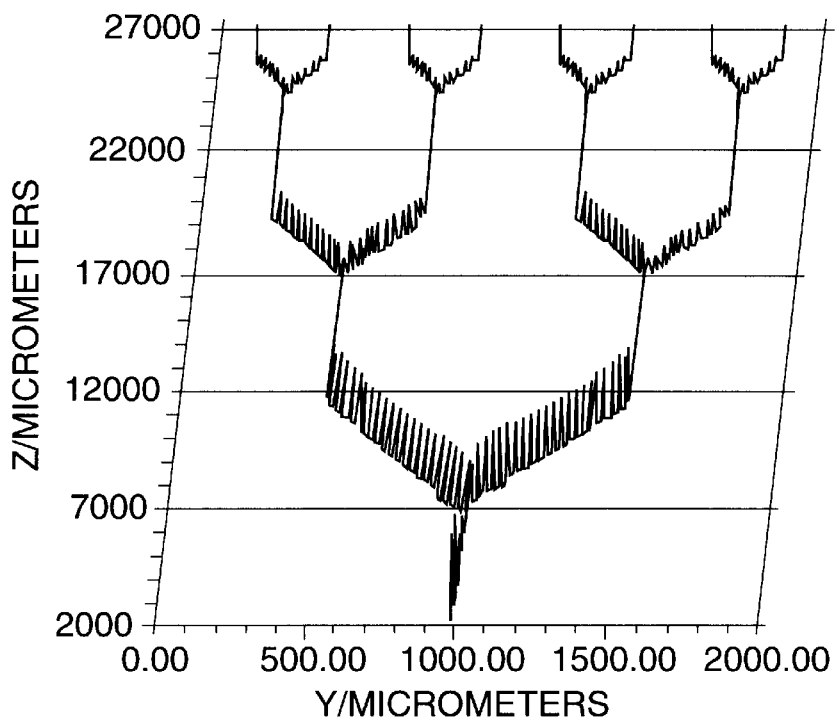
FIG. 6 is a diagram illustrating the BPM simulation when a voltage is applied across the electrodes of the 1×8 optical switch as the second embodiment of the present invention.
Figure 7:
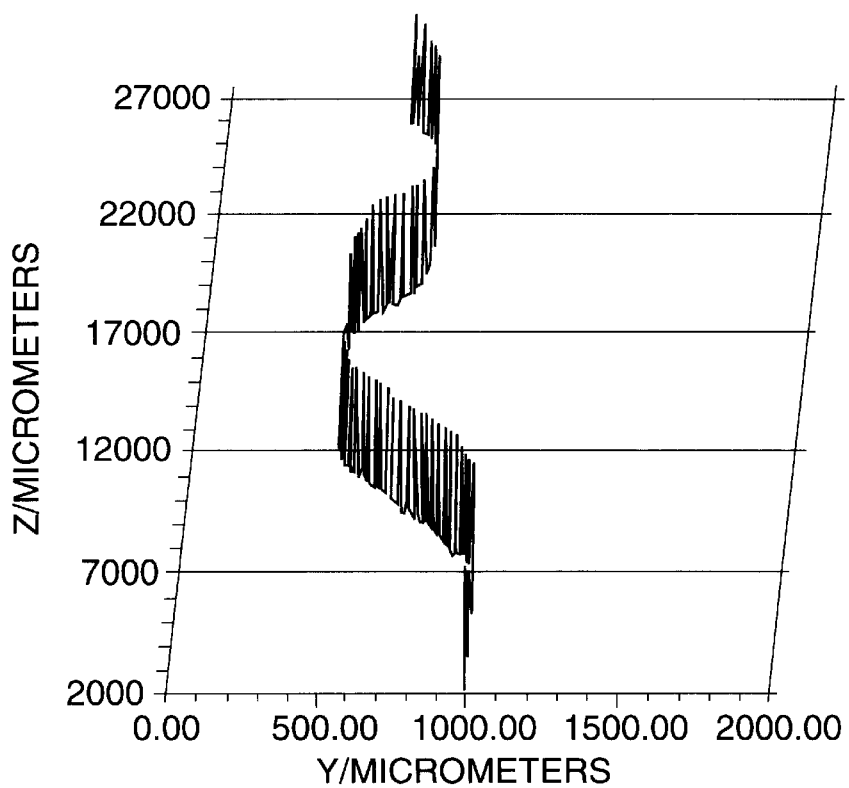
FIG. 7 is a diagram illustrating the BPM simulation when a voltage is applied across the electrodes of the 1×8 optical switch as the second embodiment of the present invention.

FIG. 6 and FIG. 7 illustrate results of the BPM (beam propagation method) simulations which can visually understand the switching operations. FIG. 6 is a BPM simulation result when a voltage is applied across the electrodes and FIG. 7 is a BPM simulation result when a voltage is not applied across the electrodes.

When the laser beam in the wavelength of 1.3 $\mu$m is guided to the incident port (not illustrated) of the incident end surface 14 of the 1×8 optical switch of this embodiment from the arranged optical fiber, the laser beam is branched to two channels in the intensity of 3 dB (50%) at each Y branching portion 9 as illustrated in FIG. 6 and is then distributed to eight optical fibers of the leaving port (not illustrated) of the outgoing end surface 15 in the equal intensity. Meanwhile, when a voltage of 5V is applied across the lower Nb doped $SrTiO_3$ substrate electrode and one electrode of the two upper electrodes 12 or 13 provided to each 1×2 optical switch provided in three stages, since the refractive index of the optical waveguide in the side where a voltage is applied is lowered, the laser beam applied from the incident end surface 14 selects the channel in which the refractive index is never lowered because no voltage is supplied in the 1×2 optical switch as illustrated in FIG. 7 and thereby the digital type optical switch performs the switching operation for the optical fiber path. Details of the driving method is similar to that of the embodiment 1 and therefore ordinary drive and memory drive can be realized.

The optical switch of the second embodiment employs the structure explained above, and in comparison with the 1×8 optical switch formed by the method of the related art, the driving method in which a voltage higher than the coercive electric field is applied and thereby the device does not show hysteresis characteristic, even if the size is as small as about 20 mm in total length, and requires only the drive voltage of 5V in the ordinary drive which is only $\frac{1}{10}$ of the voltage of the related art and moreover this device also realizes the memory switching to maintain the switching condition even when no voltage is being applied by introducing the hysteresis characteristic. Moreover, the switching frequency is higher than 100 MHz, crosstalk is 20dB or less and insertion loss is 7 dB or less and good characteristic not depending on the polarization can also be attained.

Third Embodiment

Figure 8:
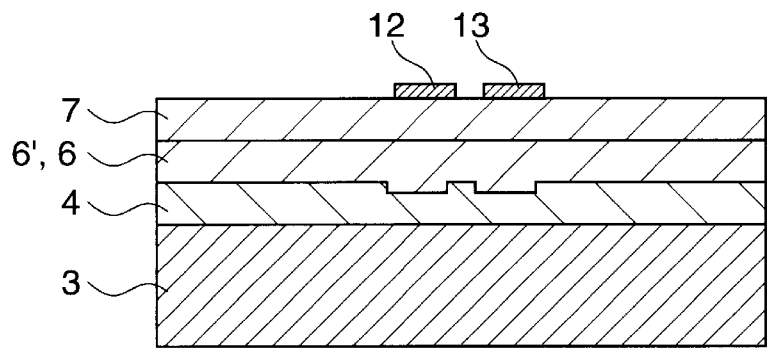
FIG. 8 is a cross-sectional view of a 1×8 optical switch as the third embodiment of the present invention.

FIG. 8 is across-sectional view of the 1×8 optical switch as the third embodiment of the present invention. The plan view and enlarged view of each branching portion are identical to the plan view and the enlarged view of each branching portion of the second embodiment illustrated in FIG. 4 and FIG. 5.

The optical switch as the third embodiment of the present invention is a digital type 1×8 optical switch of the structure similar to that of the second embodiment, except for that the La doped $SrTiO_3$ (100) single crystal semiconductor is used as a material of the substrate 3 which becomes the lower electrode, PZT in the composition having the refractive index of 2.396 as a material of the epitaxial buffer layer 4, PLZT in the composition having the refractive index of 2.420 is used as a material of the epitaxial optical waveguide 6, upper electrodes 12 and 13 are formed of Al thin film and the epitaxial clad layer 7 having PZT is provided between the epitaxial optical waveguide layer 6 and the upper electrodes 12 and 13.

Next, the manufacturing method of the optical switch as the third embodiment of the present invention will be explained.

Like the optical switch as the first embodiment, the PZT epitaxial buffer layer 4 in the composition having the refractive index of 2.396 is formed, by solid phase epitaxial growth, in the thickness of 2000 nm on the substrate 3 having the La doped $SrTiO_3$ (100) single crystal semiconductor which operates as the lower electrode.

Next, after the PZT amorphous buffer layer 5 in the composition having the refractive index of 2.396 after the epitaxial growth is formed in the thickness of 500 nm on the PZT epitaxial buffer layer 4, a part of the PZT amorphous buffer layer 5 is removed by the wet etching using the HCl aqueous solution and in regard to each 1×2 optical switch, the Y branching portion 9 in the opening angle of 0.5°, S-shape channel waveguide 10 in the radius of curvature of 9 mm resulting in the radiation loss in the level which may be neglected and linear channel waveguide 11 are processed, as illustrated in FIG. 5, as the recessed groove having the height of 230 nm and width of 5.0 $\mu$m.

Since the radius of curvature of the S-shape channel optical waveguide can be designed to provide difference of the effective refractive index of the channel optical waveguide and that of the peripheral area in a wider range by changing the material of optical waveguide layer and shape of channel, the value can further be reduced as required and thereby the size of optical switch can also be reduced.

Next, the PLZT amorphous optical waveguide layer 6' in the composition having the refractive index of 2.420 after the epitaxial growth is formed in the thickness of 500 nm.

Thereafter, the PZT amorphous buffer layer 5 and PLZT amorphous optical waveguide layer 6' are grown by solid phase epitaxial growth method as the PZT epitaxial buffer layer 4 and PLZT epitaxial optical waveguide 6.

Next, the PLZT epitaxial optical waveguide layer 6 in the composition having the refractive index of 2.420 is formed on the PZT epitaxial buffer layer 4 in the thickness of 1500 nm by solid phase epitaxial growth method. Temperature of solid phase epitaxial growth of PLZT is set to 750° C.

Next, the PZT epitaxial clad layer 7 in the composition having the refractive index of 2.396 is formed in the thickness of 2000 nm by solid phase epitaxial growth method on the PLZT epitaxial optical waveguide layer 6.

After the Al thin film is formed in the thickness of 200 nm by the sputtering method on the PLZT epitaxial optical waveguide layer 6 of the Y branching portion 9, the upper electrodes 12 and 13 in the shape having the width of 5 $\mu$m and length of 3000 $\mu$m as illustrated in FIG. 1 are formed for each 1×2 optical switch by the lift-off method in order to manufacture the single mode digital type 1×8 optical switch with three stages of 1×2 optical switch in the identical structure as the optical switch illustrated in FIG. 4.

The radius of curvature of the S-shape channel optical waveguide can be designed to provide, in a wider range, a difference between the effective refractive index of the channel optical waveguide and that of the peripheral part thereof by changing the material of substrate, buffer layer and optical waveguide and shape of channel. Therefore, the radius of curvature can further be reduced as required and accordingly the size of optical switch can also be reduced.

At the incident end surface 14 of this optical switch, one single mode optical fiber is arranged and at the outgoing end surface 15, eight single mode optical fibers are arranged with an interval of 250 $\mu$m to form an array.

When the laser beam in the wavelength of 1.3 $\mu$m is guided to the incident port (not illustrated) of the incident end surface 14 of the 1×8 optical switch of this embodiment from the arranged optical fiber, it is branched to the two channels in the intensity of 3 dB (50%) at the Y branching portion 9 and is distributed in the equal intensity to eight optical fibers of the leaving port (not illustrated) of the outgoing end surface 15. On the other hand, in regard to each 1×2 optical switch provided in three stages, when the voltage of 5V is applied across the lower La doped SrTiO$_3$ substrate electrode and one electrode of two upper electrode 12 or 13 provided to each 1×2 optical switch, the refractive index of the optical waveguide in the side where the voltage is applied is lowered and therefore the laser beam guided from the incident end surface 14 selects the channel where the refractive index is never lowered because the voltage is not applied with the 1×2 optical switch and thereby the optical fiber path can be switched by the digital type switch. Details of the driving method is identical to that of the embodiment 1 and ordinary drive and memory drive can be realized.

The optical switch of the third embodiment employs the structure explained above and the driving method in which a voltage higher than the coercive electric field is applied and thereby the device does not show hysteresis characteristic, even if the size is as small as about 20 mm in total length, and requires only the drive voltage of 5V in the ordinary drive which is only 1/10 of the voltage of the related art and moreover this device also realizes the memory switching to maintain the switching condition even when no voltage is being applied by introducing the hysteresis characteristic. Moreover, the switching frequency is higher than 100 MHz, crosstalk is 20 dB or less and insertion loss is 7 dB or less and good characteristic not depending on the polarization can also be attained.

Particularly, since the epitaxial clad layer is provided, the insertion loss of 6 dB or less, which is lower than that of the optical switch of the second embodiment, has been attained.

Fourth Embodiment

The optical switch as the fourth embodiment of the present invention is based on the principle same as that of the optical switch of the first embodiment as the digital type perfect non-blocking 8×8 optical switch of the simplified tree structure in which 48 Y branching type 1×2 optical switches and 16 X crossing type 2×2 optical switches are arranged in such a manner that after Y branching type 1×2 optical switches are arranged in series in two stages, the X crossing type 2×2 optical switches are provided and moreover the Y branching type 2×2 optical switches are arranged in series in two stages.

The optical switch of this embodiment can be manufactured in the same manner as the first embodiment, namely by laminating the materials identical to those of the first embodiment in the similar layer structure and by forming the upper electrode in the range of the width from 4 $\mu$m to 5 $\mu$m and length from 2000 $\mu$m to 3000 $\mu$m in the Y branching portion and X crossing portion of each optical switch, except for that the S-shape, linear and X crossing type channel optical waveguide is formed to adequately connect the incident end surface, outgoing end surface, Y branching type 1×2 optical switch and X crossing type 2×2 optical switch. Thereby, this optical switch can implement the switching operation of optical fiber path as the digital type optical switch.

The optical switch as the fourth embodiment of the present invention introduces the structure explained above and thereby even if the device is as small as about 30 mm in the total length, the drive voltage can be reduced to 5V which is about 1/10 of that of the related art in comparison with the 8×8 optical switch formed by the method of the related art. Moreover, the switching frequency is 100 MHz or higher, crosstalk is 20 dB or less and insertion loss is 10 dB or less and the characteristic not depending on polarization can also be attained. The details of the driving method is similar to that of the embodiment 1 and both ordinary drive and memory drive can be realized.

Fifth Embodiment

The optical switch as the fifth embodiment of the present invention is the digital perfect non-blocking type 8×8 optical switch in which 112 Y branching type 1×2 optical switches based on the principle similar to that of the optical switch as the first embodiment are arranged in the tree structure.

The optical switch of the present embodiment can be manufactured in the same manner as the first embodiment, namely by laminating in the same layer structure the material similar to that of the first embodiment and forming the upper electrode in the range of shape having the width from 4 $\mu$m to 5 $\mu$m and length from 2000 $\mu$m to 3000 $\mu$m at the Y branching portion and X crossing portion of each optical switch except for that the S-shape, linear and X crossing type channel optical waveguide is formed to adequately connect the incident end surface, outgoing end surface, Y branching type 1×2 optical switch. Thereby, this optical switch can implement the switching operation of optical fiber path as the digital type optical switch.

Owing to the structure explained above, the optical switch as the fifth embodiment requires the drive voltage of only 5V which is about 1/10 of that required in the related art in comparison with the structure of the 8×8 optical switch formed by the related art although it is as small as about 38 mm in the total length and also assures the switching frequency of 100 MHz or higher, crosstalk of 20 dB or less and insertion loss of 10 dB or less with good characteristic not depending on the polarization. Details of the driving method is similar to that of the first embodiment and ordinary drive and memory drive can also be realized.

Sixth Embodiment

The 8×8 optical switch as the sixth embodiment of the present invention is the crossbar type perfect non-blocking 8×8 optical switch combining 64 2×2 optical switches based on the principle similar to that of the optical switch as the first embodiment.

Figure 9:
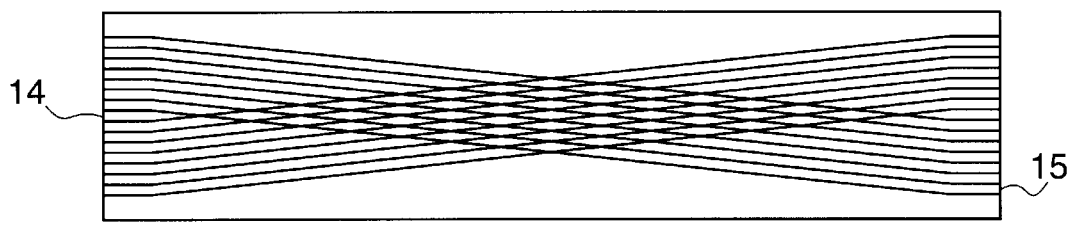
FIG. 9 is a plan view of a 1×8 optical switch as the sixth embodiment of the present invention.

FIG. 9 is a plan view of the 8×8 optical switch as the sixth embodiment of the present invention.

Figure 10:
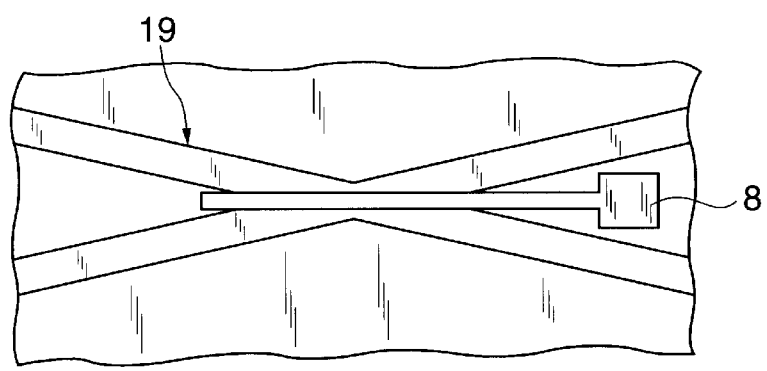
FIG. 10 is an enlarged view of the crossing portion of the 8×8 optical switch as the sixth embodiment of the present invention.
Figure 11:
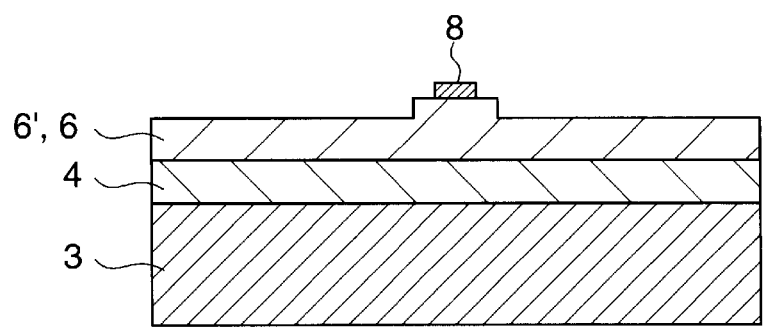
FIG. 11 is a cross-sectional view of the 8×8 optical switch as the sixth embodiment of the present invention.

FIG. 10 is an enlarged view of the crossing portion thereof and FIG. 11 is a cross-sectional view thereof.

As illustrated in FIG. 9, the optical switch as the sixth embodiment has the incident end surface 14 and outgoing end surface 15. The 16 ports are respectively provided at the incident end surface 14 and outgoing end surface 15 and eight ports among respective ports are provided as the dummy ports. These incident ports and outgoing ports are coupled by the X crossing portion 19 and the linear channel waveguide 11 in which both ends of crossbar structure are bent.

Next, the manufacturing method of the optical switch as the sixth embodiment will be explained.

The PZT epitaxial buffer layer 4 in the composition having the refractive index of 2.415 is formed by solid phase epitaxial growth in the thickness of 1200 nm on the substrate having the Nb doped $SrTiO_3$ (100) single crystal semiconductor which operates as the lower electrode. Next, the PZT epitaxial optical waveguide layer 6 in the composition having the refractive index of 2.477 is formed by solid phase epitaxial growth in the thickness of 1300 nm on the PZT epitaxial buffer layer 4. Next, after PZT amorphous optical waveguide layer 6' in the composition having the refractive index of 2.477 after the epitaxial growth is formed in the thickness of 300 nm on the PZT epitaxial optical waveguide layer 6, the PZT amorphous optical waveguide layer 6' is removed leaving a part thereof by the reactive ion etching using the resist pattern of the X crossing type channel shape to process the channel waveguide of the crossbar structure illustrated in FIG. 9 as the projected portion having the height of 300 nm and width of 5.0 μm. Thereafter, the PZT amorphous optical waveguide layer 6' is grown by solid phase epitaxial growth method to form the PZT epitaxial optical waveguide layer 6.

After forming the laminated thin film having Al in the thickness of 200 nm and ITO in the thickness of 300 nm by the sputtering method on the PZT epitaxial optical waveguide layer 6 at the center of X crossing portion 19, the upper electrode 8 in the shape illustrated in FIG. 10 is formed for each 2×2 optical switch. Thereby, the crossbar type perfect non-blocking type 8×8 optical switch having the layer structure illustrated in FIG. 11 can be manufactured to enable the switching of the optical fiber path.

Moreover, the optical switch providing the upper electrode 8 in the shape illustrated in FIG. 10 is a so-called a total reflection type switch but this optical switch functions as the Bragg reflection type switch by introducing the grating shape upper electrode. In any cases, the principle of the driving method is almost similar to that of the first embodiment and thereby the ordinary drive and memory drive can be realized.

Seventh Embodiment

The optical switch as the seventh embodiment of the present invention is the single mode X crossing type 2×2 optical switch based on the principle similar to that of the optical switch as the first embodiment. The crossing portion thereof has the same structure as the crossing portion as the sixth embodiment illustrated in FIG. 10.

The PZT epitaxial buffer layer 4 in the composition having the refractive index of 2.427 in the wavelength of 0.850 μm is formed by the Rf magnetron sputtering method in the thickness of 2000 nm on the $SrTiO_3$ (100) single crystal substrate 3 to be used as the lower electrode which has been obtained by epitaxial growth of $SrRuO_3$ by the Rf magnetron sputtering method. Next, The PLZT epitaxial optical waveguide layer 6 in the composition having the refractive index of 2.454 in the wavelength of 0.850 μm is formed in the thickness of 1300 nm by the Rf magnetron sputtering method on the PZT epitaxial buffer layer 4. Next, after forming the PLZT amorphous optical waveguide layer 6' in the composition having the refractive index of 2.454 in the wavelength of 0.850 μm after the epitaxial growth in the thickness of 300 nm on the PLZT epitaxial optical waveguide layer 6, the PZT amorphous optical waveguide layer 6' is removed leaving a part thereof by the reactive ion etching and the X crossing type channel waveguide is processed as the projected portion having the height of 300 nm and width of 5.0 μm. Thereafter, the PZT amorphous optical waveguide layer 6' is grown by solid phase epitaxial growth to form the PZT epitaxial optical waveguide layer 6.

After forming the laminated thin film having Al in the thickness of 200 nm and ITO in the thickness of 300 nm by the sputtering method on the PZT epitaxial optical waveguide layer 6 at the center of the X crossing portion 19, the upper electrode 8 in the shape illustrated in FIG. 10 is formed by the lift-off method. Thereby, the single mode X-crossing type 2×2 optical switch can be manufactured to cover the optical beam in the wavelength of 0.850 μm to realize the switching of the optical fiber path. Here, the principle of driving method is almost similar to that of the embodiment 1 to realize the ordinary drive and memory drive.

Eighth Embodiment

Figure 12:
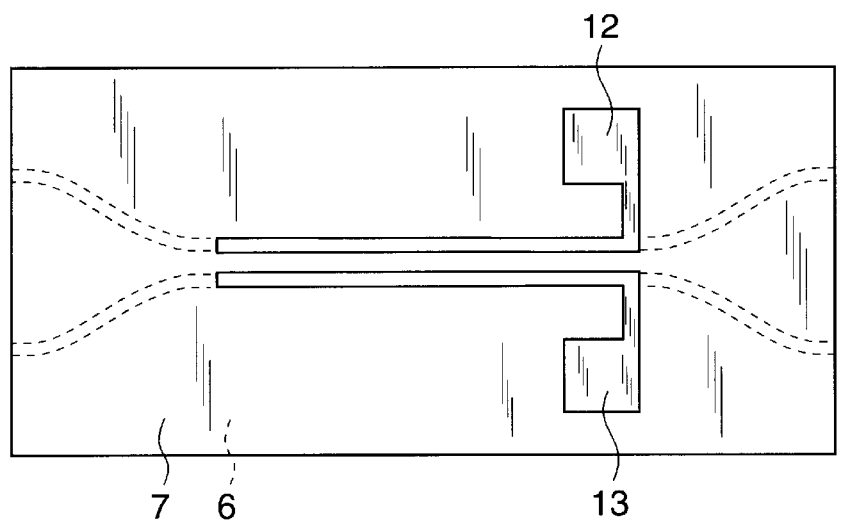
FIG. 12 is a schematic view of a 2×2 optical switch as the eighth embodiment of the present invention.
Figure 13:
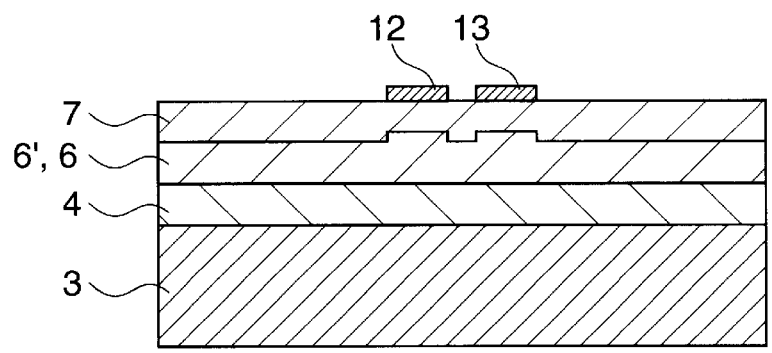
FIG. 13 is a cross-sectional view of the 2×2 optical switch as the eighth embodiment of the present invention.

The 2×2 optical switch as the eighth embodiment of the present invention is the single mode directional coupler type 2×2 optical switch. FIG. 12 is a schematic diagram of the 2×2 optical switch as the eighth embodiment of the present invention. FIG. 13 is a cross-sectional view thereof.

The $SrTiO_3$ epitaxial buffer layer 4 in the composition having the refractive index of 2.308 is formed in the thickness of 1000 nm by the Rf magnetron sputtering method on the sapphire R surface single crystal substrate 3, used as the lower electrode, which is obtained through the epitaxial growth of the $SrRuO_3$ thin film by the Rf magnetron sputtering method. Next, the PZT epitaxial optical waveguide layer 6 in the composition having the refractive index of 2.477 is formed in the thickness of 1400 nm by the Rf magnetron sputtering method on the $SrTiO_3$ epitaxial buffer layer 4. Next, the PZT epitaxial optical waveguide layer 6 is removed leaving a part thereof by the reactive ion etching and the directional coupling switch shape channel waveguide illustrated in FIG. 12 is processed as the projected portion having the height of 200 nm and width of 5.0 µm. Next, the PZT epitaxial clad layer 7 in the composition having the refractive index of 2.415 is formed in the thickness of 1000 nm by the Rf magnetron sputtering method on the PLZT epitaxial optical waveguide layer 6.

After forming the Al thin film in the thickness of 200 nm by the sputtering method on the PZT epitaxial optical waveguide layer 6 at the center of the X crossing portion 19, the upper electrode 8 of the shape illustrated in FIG. 10 is formed by the lift-off method and thereby the single mode X crossing type 2×2 optical switch similar to the sixth embodiment can be manufactured to realize the switching of optical fiber path. The principle of driving method is almost similar to that of the first embodiment and ordinary drive and memory drive can be implemented.

Ninth Embodiment

Figure 14:
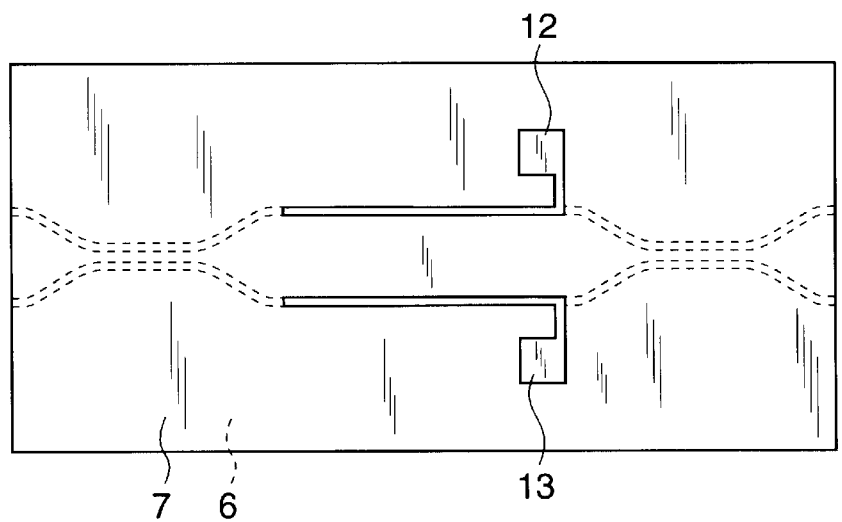
FIG. 14 is a schematic diagram of a 2×2 optical switch as the ninth embodiment of the present invention.
Figure 15:
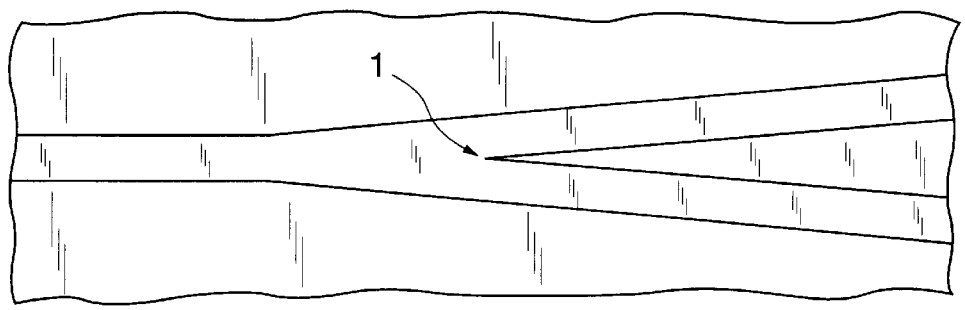
FIG. 15 is a schematic diagram illustrating the ideal shape of the Y branching portion in the Y branching type channel waveguide of a digital type optical switch.
Figure 16:
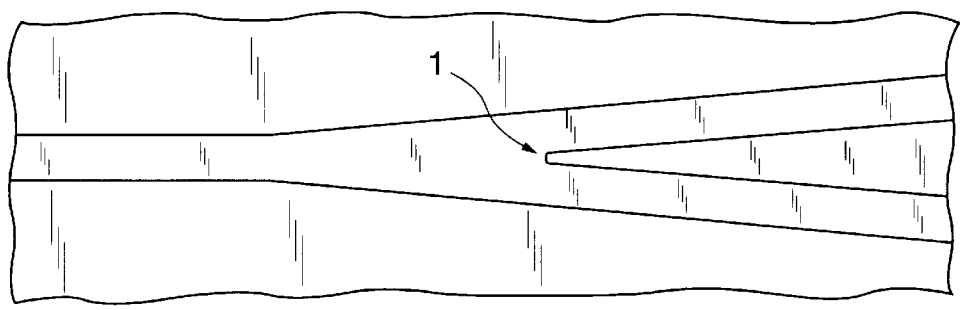
FIG. 16 is a schematic diagram illustrating the shape of the Y branching portion in the Y branching type channel waveguide of the digital type optical switch manufactured by the manufacturing method of the related art.
Figure 17:
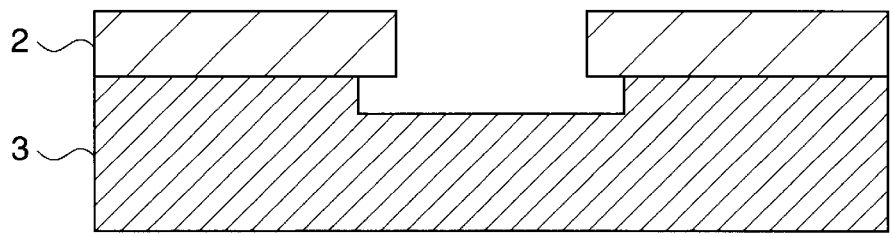
FIG. 17 is a diagram for explaining the patterning method of an Si substrate utilizing the under etching effect during the wet etching process.

FIG. 14 is a schematic diagram of the 2×2 optical switch as the ninth embodiment of the present invention. As illustrated in FIG. 14, the 2×2 optical switch as the ninth embodiment of the present invention is the single mode Mach-Zehnder interference type 2×2 optical switch and can be manufactured in the same manner as the 2×2 optical switch as the eighth embodiment as illustrated below.

The PZT epitaxial buffer layer 4 in the composition having the refractive index of 2.415 is formed in the thickness of 2000 nm by the Rf magnetron sputtering method is formed on the sapphire R surface single crystal substrate 3, used as the lower electrode, formed through the epitaxial growth of the $SrRuO_3$ thin film by the Rf magnetron sputtering method. Next, the PZT epitaxial optical waveguide layer 6 in the composition having the refractive index of 2.477 is formed in the thickness of 1600 nm by the Rf magnetron sputtering method on the PZT epitaxial buffer layer 4.

Next, the PZT epitaxial optical waveguide layer 6 is removed leaving a part thereof by the reactive ion etching and the Mach-Zehnder interference switch shape channel waveguide illustrated in FIG. 14 is processed as the projected portion having the height of 300 nm and width of 5.0 µm.

Next, after forming the laminated thin film having Al in the thickness of 200 nm and ITO in the thickness of 300 nm by the sputtering method on the PZT epitaxial optical waveguide layer 6, the upper electrodes 12 and 13 in the shape illustrated in FIG. 14 is formed to manufacture the single mode Mach-Zehnder interference type 2×2 optical switch to realize the switching of the optical fiber path. The principle of the driving method is almost similar to that of the first embodiment to implemented ordinary drive and memory drive.

Tenth Embodiment

The 2×2 optical switch as the tenth embodiment of the present invention is the single mode Mach-Zehnder interference type 2×2 optical switch of the structure similar to that of the 2×2 optical switch of the ninth embodiment illustrated in FIG. 14 and this optical switch can be manufactured by the method similar to that of the 2×2 optical switch as the eighth embodiment.

The $LiTaO_3$ epitaxial buffer layer 4 is formed in the thickness of 1000 nm by solid phase epitaxial growth using the $LiTaO_3$ precursor solution on the sapphire C surface single crystal substrate 3, used as the lower electrode, obtained through epitaxial growth of the Al doped ZnO conductive thin film by the Rf magnetron sputtering method. Next, the $LiNbO_3$ epitaxial optical waveguide layer 6 is formed in the thickness of 1100 nm by solid phase epitaxial growth using the $LiNbO_3$ precursor solution on the $LiTaO_3$ epitaxial buffer layer 4.

Next, after forming the $LiNbO_3$ amorphous optical waveguide layer 6' in the thickness of 300 nm on the $LiNbO_3$ epitaxial optical waveguide layer 6, this layer is removed leaving a part thereof by the ion beam etching and the Mach-Zehnder interference switch shape channel waveguide illustrated in FIG. 14 is processed as the projected portion having the height of 300 nm and width of 5.0 µm. Thereafter, the $LiNbO_3$ amorphous optical waveguide layer 6' is grown by solid phase epitaxial growth method to become the $LiNbO_3$ epitaxial optical waveguide layer 6.

Next, after forming the laminated thin film having Al in the thickness of 200 nm and ITO in the thickness of 200 nm by the sputtering method on the $LiNbO_3$ epitaxial optical waveguide layer 6, the upper electrodes 12 and 13 in the shape illustrated in FIG. 14 are formed by the lift-off method and thereby the single mode Mach-Zehnder interference type 2×2 optical switch can be formed to implement the switching of the optical fiber path.

The practical embodiments of the optical switch and matrix optical switch of the present invention have been explained above and these optical switch and matrix optical switch of the present invention are never limited thereto and these may be manufactured using the other materials as will be explained later and may also be manufactured by other thin film forming methods. The structures thereof may also be changed adequately within the range not deteriorating the effect of the present invention.

In the above embodiments, the matrix optical switch is intended to the switching of optical fiber path but it can also be used particularly as the switch for the optical logic circuit which uses the memory drive to store the switching condition.

Moreover, in the above embodiments, an examples to which the optical switch of the present invention are discussed but the optical device of the present invention can maintain, even when a voltage is not applied, the constant characteristic (for example, refractive index) of the channel optical waveguide and therefore this optical switch can also be applied to an optically readable memory as well as the optical switch.

The substrate used as the lower electrode in the present invention is a conductive or semiconductor single crystal substrate or a substrate providing, at the surface, an epitaxial or single orientation conductive or semiconductive thin film.

As the conductive or semiconductor substrate material, oxides such as Nb or La doped $SrTiO_3$, Al doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $Mg_2TiO_4$, $Mg_2TiO_4$, discrete semiconductors such as Si, Ge, diamond, III–V group compound semiconductors such as AlAs, AlSb, AlP, GaAs, GaSb, InP, InAs, InSb, AlGaP, AlInP, AlGaAs, AlInAs, AlAsSb, GaInAs, GaInSb, GaAsSb, InAsSb, II–VI group compound semiconductors such as ZnS, ZnSe, ZnTe, CdSe, CdTe, HgSe, HgTe, CdS and metals such as Pd, Pt, Al, Au, Ag may be used. Among these materials, it is desirable to use an oxide as the substrate material because it is preferable for film quality of the optical waveguide layer having an oxide ferroelectric material located at the upper area.

It is desirable that these conductive or semiconductor single crystal substrate, conductive or semiconductor epitaxial or single orientation thin film are selected depending on carrier mobility required by the crystal structure of oxide ferroelectric material forming the optical waveguide layer, switching rate or modulation rate.

Moreover, the relative dielectric constant of the ferroelectric material is ranged from 10 to 1000 but it is desirable to set the specific resistance of substrate to $10^4 \Omega \cdot cm$ or less and more preferably to $10^2 \Omega \cdot cm$ or less from the view point of the RC time constant and voltage drop in order to attain the response of 1 kHz or higher even with the optical waveguide element having such ferroelectric material.

On the occasion of providing the epitaxial or single orientation conductive or semiconductive thin film at the surface, oxides such as $SrTiO_3$, $BaTiO_3$, $BaZrO_3$, $LaAlO_3$, $ZrO_2$, $Y_2O_3$ 8%-$ZrO_2$, MgO, $MgAl_2O_4$, $LiNbO_3$, $LiTaO_3$, $Al_2O_3$, ZnO, discrete semiconductors such as Si, Ge and diamond, III–V group compound semiconductors AlAs, AlSb, AlP, GaAs, GaSb, InP, InAs, InSb, AlGaP, AlInP, AlGaAs, AlInAs, AlAsSb, GaInAs, GaInSb, GaAsSb, InAsSb and II–VI group compound semiconductors such as ZnS, ZnSe, ZnTe, CdSe, CdTe, HgSe, HgTe, CdS may be used for the substrate. Even in the case of providing the conductive or semiconductive thin film at the surface, it is desirable to use the oxide as the substrate material because it is preferable for the thin film of optical waveguide having the oxide ferroelectric material to be located at the surface.

When a buffer layer is provided between the conductive substrate and optical waveguide layer, the voltage applied across the upper and lower electrodes is distributed depending on respective capacity of the optical waveguide layer and buffer layer and the effective voltage to be applied to the optical waveguide layer is lowered. However, the higher effective voltage can be applied to the optical waveguide layer by utilizing the buffer layer of higher dielectric constant of the constant thickness. As the buffer layer, it is desirable to select an oxide which has the refractive index which is smaller than that of the optical waveguide layer material and a ratio of the relative dielectric constants of the buffer layer and optical waveguide layer of 0.002, preferably 0.006 or higher and the relative dielectric constant of the buffer layer itself of 8 or higher.

Figures 20A, 20B:
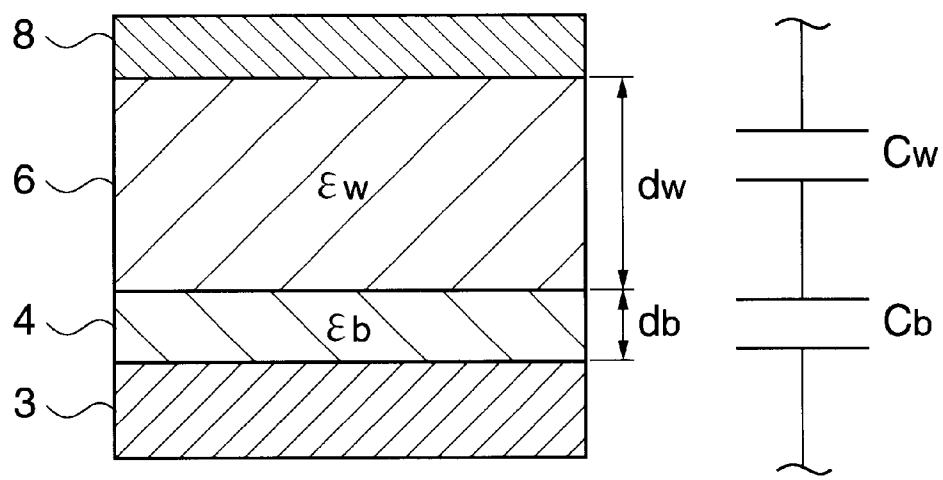
FIGS. 20A and 20B are concept diagrams illustrating an equivalent circuit of the optical switch of the present invention illustrated in FIG. 19.

FIG. 20 is an equivalent circuit which is expressed by a serial circuit of the capacitance $C_w$ of optical waveguide layer 6 and capacitance $C_b$ of buffer layer 4. When the total application voltage is defined as $V_0$, relative dielectric constant of optical waveguide layer as $\in_w$, film thickness as $d_w$, relative dielectric constant of buffer layer as $\in_b$, vacuum dielectric constant as $\in_0 = 8.854 \times 10^{-14}$ (F/cm), and electrode area as S, the effective voltage $V_w$ to be applied to the optical waveguide layer is expressed by the following formula.

$$V_w = C_b/(C_w + C_b) \times V_0 = \in_b d_w /(\in_w d_b + \in_b d_w) \times V_0$$

In the present invention, since db/dw is set to 0.1 or larger, the area where the $V_w/V_0$ has the value of 0.02 or larger, namely $\in_b/\in_w$ which gives the effective voltage equal to 2% of the applied voltage is 0.002 or larger, more preferably the area where $V_w/V_0$ has the value of 0.1 or larger, namely $\in_b/\in_w$ which gives the effective voltage equal to 10% of the applied voltage is 0.006 or larger may be used. The upper limit of $\in_b/\in_w$ is determined by combination of the materials of the buffer layer and optical waveguide layer and becomes about 10. Since the relative dielectric constant of the optical waveguide layer sometimes becomes about 4000, it is desirable that the relative dielectric constant of the buffer layer has the value of 8 or larger which assures 0.02 or larger as the value of $\in_b/\in_w$. Under the condition that the effective voltage becomes 2% or less of the applied voltage, the epitaxial optical waveguide having the electro-optic effect is provided on the conductive substrate and it is not effective for the object to remarkably reduce the drive voltage. Above principle can also be applied to the clad layer.

Moreover, since the buffer layer material reduces the optical propagation loss resulting from scattering due to grain boundary at the surface of optical waveguide and in the optical waveguide, it is necessary to maintain the epitaxy relationship between the conductive substrate material and optical waveguide material. As the condition to maintain this epitaxy relationship, it is desirable that the buffer layer material resembles the crystal structure of the conductive substrate material and optical waveguide layer material and difference of lattice constants is 10% or less. However, this relationship must not always be maintained when the epitaxy relationship can be attained.

Practically, the buffer layer material used in the present invention can be selected from the $ABO_3$ type perovskite type oxide of the tetragonal system, rhombohedral system or pseudo-cubic system such as $SrTiO_3$, $BaTiO_3$, $(Sr_{1-x}Ba_x)TiO_3$ (0<x<1.0), $PbTiO_3$, $Pb_{1-x}La_x(Zr_yTi_{1-y})_{1-x/4}O_3$ (0<x<0.3, 0<y<1.0, PZT, PLT, PLZT depending on the values of x and y), $Pb(Mg_{1/3}Nb_{2/3})O_3$, $KNbO_3$ or the like, ferroelectric materials of the hexagonal system such as $LiNbO_3$, $LiTaO_3$ or the like, tungsten bronze type oxides such as $Sr_xBa_{1-x}Nb_2O_6$, $Pb_xBa_{1-x}Nb_2O_6$ or the like and moreover $Bi_4Ti_3O_{12}$, $Pb_2KNb_5O_{15}$, $K_3Li_2Nb_5O_{15}$, ZnO and from substituted derivatives of these compounds.

It is desirable that a thickness ratio of the buffer layer and optical waveguide layer is at least 0.1 or larger and more preferable when it is 0.5 or larger for the single mode operation of $TE_0$ in order to reduce the propagation loss to 1 dB/cm or less. Moreover, simultaneously, it is also desirable that thickness of buffer layer is 10 nm or more. For the optical waveguide layer, an oxide ferroelectric material having a higher electro-optic coefficient and refractive index larger than that of the buffer layer material is selected. The optical waveguide layer material used in the present invention is selected, in practical, from the $ABO_3$ type perovskite oxides of the tetragonal system, rhombohedral system or pseudo-cubic system such as $BaTiO_3$, $PbTiO_3$, $Pb_{1-x}La_x(Zr_yTi_{1-y})_{1-x/4}O_3$ (PZT, PLT, PLZT depending on the values of x and y), $Pb(Mgl_{1/3}Nb_{2/3})O_3$, $KNbO_3$, ferroelectric material of hexagonal system such as $LiNbO_3$, $LiTaO_3$, tungsten bronze type oxides such as $Sr_xBa_{1-x}Nb_2O_6$, $Pb_xBa_{1-x}Nb_2O_6$, moreover $Bi_4Ti_3O_{12}$, $Pb_2KNb_5O_{15}$, $K_3Li_2Nb_5O_{15}$ and the substituted derivatives of these materials.

Thickness of the optical waveguide layer is generally set to the value between 0.1 $\mu$m and 10 $\mu$m but this value may be adequately selected depending on the purpose.

In the case of providing the clad layer, the material similar to the buffer layer may be used for the clad layer material. Namely, the material selected should have the refractive index which is smaller than that of the optical waveguide layer material, the relative dielectric constant ratio between the clad layer and optical waveguide of 0.002 or larger and more specifically the relative dielectric ratio between the clad layer and optical waveguide of 0.006 or larger and the relative dielectric constant of the clad layer of 8 or larger.

For the clad layer material, it is not always required to maintain the epitaxy relationship to the optical waveguide and a polycrystal thin film may also be used, but it is desirable to attain uniform boundary to maintain the epitaxy relationship to the optical waveguide material. As the condition to maintain the epitaxy relationship, it is desirable that the clad layer material resembles the crystal structure of the optical waveguide layer material and difference of lattice contents is 10% or less but when the epitaxy relationship can be maintained, this relationship is not always required.

Practically, the clad layer material to be used in the present invention is selected from the $ABO_3$ type perovskite oxides of tetragonal system, rhombohedral system or pseudo-cubic system such as $SrTiO_3$, $BaTiO_3$, $(Sr_{1-x}Ba_x)TiO_3$, $PbTiO_3$, $Pb_{1-x}La_x(Zr_yTi_{1-y})_{1-x/4}O_3$, $Pb(Mg_{1/3}Nb_{2/3})O_3$, $KNbO_3$ or the like, ferroelectric material of hexagonal system represented by $LiNbO_3$, $LiTaO_3$ or the like, tungsten bronze type oxides such as $Sr_xBa_{1-x}Nb_2O_6$, $Pb_xBa_{1-x}Nb_2O_6$ or the like, moreover $Bi_4Ti_3O_{12}$, $Pb_2KNb_5O_{15}$, $K_3Li_2Nb_5O_{15}$, $ZnO$ and substituted derivatives of above compounds.

The desirable thickness ratio of clad layer and optical waveguide layer is at least 0.1 or larger and is more preferable ratio is 0.5 or larger as in the case of the buffer layer. Simultaneously, desirable thickness of clad layer is 10 nm or more.

Various kinds of combinations satisfying the following conditions are proposed for the lower electrode substrate, buffer layer, optical waveguide layer and clad layer. Among these combinations, it is desirable to use a substrate on which the doped $SrTiO_3$ single crystal semiconductor substrate or doped $SrTiO_3$ semiconductive thin film are provided as the lower electrode. For this substrate material, it is most effective to use $Pb_{1-x}La_x(Zr_yTi_{1-y})_{1-x/4}O_3$ as the materials of buffer layer, optical waveguide layer and clad layer because the epitaxial growth is possible because these materials have the similar perovskite structure and provides a smaller lattice constant, the refractive index is larger than that (2.399) of the substrate material, these materials have higher electro-optic coefficient and the refractive index may be changed to a large extent only by changing the composition ratio (namely, the ratio of Pb, La, Zr, Ti).

For the upper electrode, various metals and alloys such as Al, Ti, Cr, Ni, Cu, Pd, Ag, In, Sn, Ta, W, Ir, Pt, Au and oxides such as Al doped ZnO, $In_2O_3$, ITO, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $Mg_2TiO_4$, $MgTi_2O_4$ or the like may be used. When the clad layer is used, it is desirable to use a metal electrode which may easily be fine-processed and when the clad layer is not used, it is effective to use the oxide electrode, more preferably, to use transparent oxide electrode. Moreover, when fatigue and DC drift are generated with passing of time, it is effective to use an oxide.

The optical switch of the present invention can be structured as the optical switch of every type having the branching type channel optical waveguide.

The principle for switching the optical path of optical switch having the branching type channel optical waveguide can be realized by the method for controlling the optical path by applying the electric field to a directional coupler in which two optical waveguides are approximately arranged, the Mach-Zehnder type method for switching the output end by isolating the incident light beam to a couple of beams with a directional coupler and then controlling the interference condition at the directional coupler in the outgoing side by giving phase difference with the refractive index generated by the electric field between the light beams passing respective paths, the method for switching the optical path by controlling interference between the optical modes at the X crossing portion, the digital type method for switching the optical path by controlling the lateral distribution of optical mode with the refractive index generated by the electric field at the Y branching portion or asymmetrical X crossing portion and the method for switching the optical path through total reflection or Bragg reflection by controlling the refractive index by providing the electrode to the X crossing portion.

The optical switch having the branching type channel optical waveguide can be sorted, depending on the principle for switching the optical path, to the Mach-Zehnder interference switch, directional coupling switch, total reflection type switch, Bragg reflection type switch or digital type switch and the optical switch of the present invention can be structured as an optical switch covering every kind of switches listed above.

Among these optical switches, the digital type switch is most desirable from the points of view that the condition is maintained even if a higher voltage is applied after the optical path is switched with a constant voltage applied and the plural operating points are never generated, excellent tolerance of operating voltage is assured, characteristic does not change depending on polarization but changes a little depending on the wavelength of optical beam.

As is already explained, the oxide ferroelectric materials having higher electro-optic coefficient are selected for the optical waveguide layer but many materials have the more excellent characteristics than $LiNbO_3$. Particularly, $Pb_{1-x}La_x(Zr_yTi_{1-y})_{1-x/4}O_3$ is known as the material having very higher electro-optic coefficient and the electro-optic coefficient of $LiNbO_3$ single crystal is 30.9 pm/V, while that of PLZT (8/65/35:x=8%, y=65%, 1−y=35%) ceramics is 612 pm/V.

As explained above, many ferroelectric materials have the characteristics more excellent than $LiNbO_3$ but almost all elements actually manufactured use $LiNbO_3$ or $LiTaO_3$, because the epitaxial growth of thin film must be conducted for the materials other than $LiNbO_3$ and $LiTaO_3$ for which the single crystal growth technique and the optical waveguide technique by the Ti diffusion to its wafer and proton exchange have been established and the vapor phase epitaxy technique of the related art cannot manufacture the thin film optical waveguide in the quality of level of practical use. Moreover, another large reason why the almost all elements manufactured actually use $LiNbO_3$ and $LiTaO_3$ is that the technique of the related art can manufacture the epitaxial thin film optical waveguide but the good fine patterns such as channel optical waveguide.

Meanwhile, the present invention realizes manufacture of the thin film optical waveguide in the quality of level of actual use with solid phase epitaxial growth technique and moreover manufacture the channel optical waveguide in the ideal shape with excellent control ability through the wet etching of amorphous thin film which is formed as the epitaxial buffer layer or epitaxial optical waveguide layer by utilizing solid phase epitaxial growth technique.

In addition, in the investigation process of the present invention, it has been proved that $LiNbO_3$ or $LiTaO_3$ does not show any hysteresis in its change of refractive index for a voltage to be applied under the room temperature, but the epitaxial thin film of almost all ferroelectric material other than $LiNbO_3$ and $LiTaO_3$ show the hysteresis and moreover the changing characteristic of refractive index for voltage is asymmetrical.

Usually, the hysteresis characteristic interferes the use with good reproducibility of an optical device. In the present invention, in view of overcoming such hysteresis characteristic, a single pole initial voltage is applied to the channel optical waveguide from the upper electrode and thereafter the voltage of the same pole as the initial voltage is applied for the drive. Thereby, good operation of optical device not generating the hysteresis characteristic can be realized. As the initial voltage, it is desirable that the voltage gives the electric field higher than the coercive electric field to the optical waveguide layer.

Moreover, it is also possible to drive an optical device by using inversely the hysteresis characteristic, namely by utilizing the first characteristic obtained when the single polarity voltage is applied to one channel of the branching channel optical waveguide and thereafter it is lowered to zero and the second characteristic different from the first characteristic obtained when the voltage of inverse polarity to the single polarity voltage is applied to the other channel and thereafter it is reduced to zero. In this case, it is desirable that the applied voltage gives the electric field higher than the coercive electric field to the optical waveguide layer.

With this method, even after the optical device is isolated from the power supply, difference of refractive index required for drive of the optical device can be maintained between the channels. Therefore, the optical device enables the use as a memory utilizing above function and moreover power consumption required for drive of optical device can remarkably be reduced.

Figure 23:
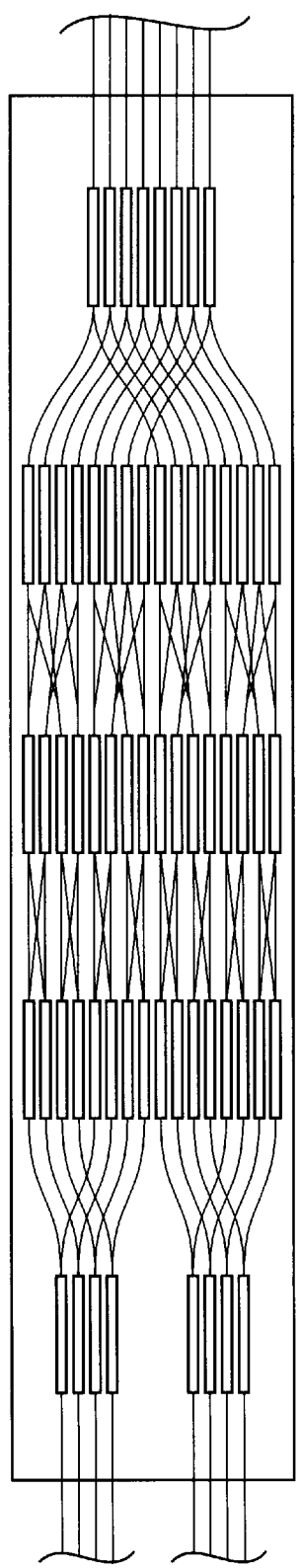
FIG. 23 is a plan view of an 8×8 optical switch used for measurement of power consumption.
Figure 24:
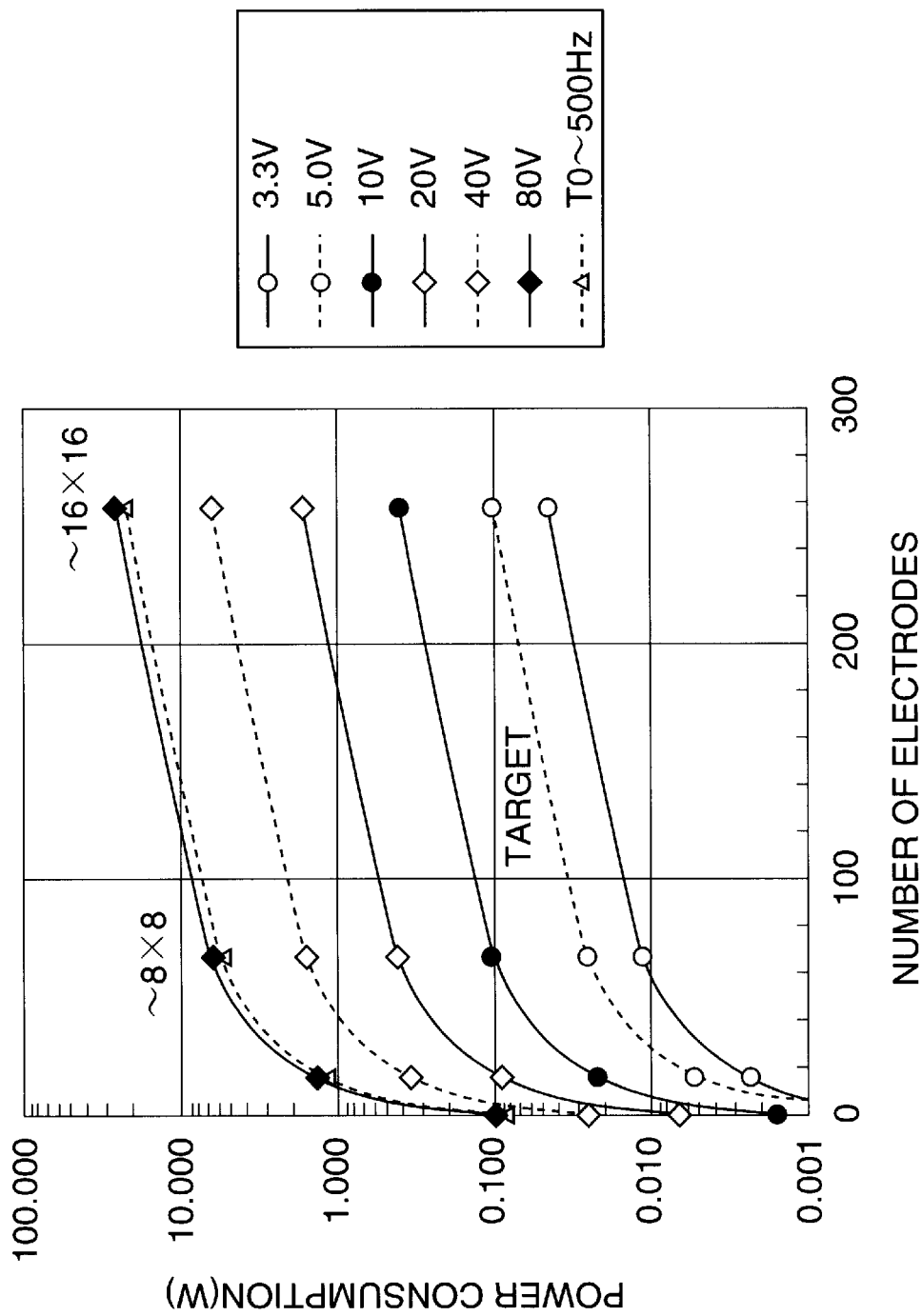
FIG. 24 is a graph plotting, for the number of upper electrodes, the power consumption required to drive the matrix optical switch.

As illustrated in FIG. 23, the 8×8 matrix optical switch and 16×16 matrix optical switch have been manufactured by arranging the optical switches of the first embodiment in the form of a matrix. FIG. 24 is a graph in which the power consumption required for drive of the matrix optical switch is plotted for the number of upper electrodes. Here, the power consumption is defined as the electrical power consumed only by the switching operation and does not include total electrical power of the drive circuit to be consumed at the time of driving the device. Moreover, the number of upper electrodes is identical to the number of branching portions.

Power consumption increases as the voltage required for the switching operation increases and moreover it also increases as the number of electrodes increases. In the present invention, since drive with 5V is possible, power consumption can remarkably be reduced in comparison with the switch of related art which requires several tens of volts and thermo-optical switch, moreover stored condition can be reproduced without application of voltage and such power consumption can be reduced to zero. Therefore, particularly in the case of the matrix optical switch which requires a large voltage for the switching operation and the matrix optical switch which requires large number of electrodes, energy saving can be implemented.

The method to form the buffer layer, optical waveguide layer and clad layer can be selected as desired from the gas phase epitaxial growth methods selected from electron beam evaporation, flash evaporation, ion plating, Rf-magnetron sputtering, ion beam sputtering, laser abrasion, MBE (molecular beam epitaxy), CVD (chemical vapor deposition), plasma CVD, MOCVD (organic metal chemical vapor deposition); solid phase epitaxial growth method in which amorphous thin film is heated and crystallized after the amorphous thin film is formed by the vapor growth method; or thin film forming method such as solid phase epitaxial growth method through heating and crystallization of amorphous thin film formed by the wet processes such as sol-gel method, MOD (Metal Organic Deposition) method or the like.

Among these methods, it is desirable to form each layer by solid phase epitaxial growth method. Particularly, solid phase epitaxial growth method, in which the substrate is coated with the organic metal compound solution such as metal alkoxide or organic metal salt by the wet process such as sol-gel method and MOD method or the like and is then heated to form an amorphous thin film and thereafter this amorphous thin film is heated and crystallized, not only assures low facility cost and good uniformity in the substrate surface in comparison with the other various vapor growth methods but also easily realizes, with good reproducibility, the control of refractive index which is important to form the buffer layer, optical waveguide layer and clad layer only by changing the mixing composition of the organic metal compound precursor, moreover enables the growth of buffer layer, optical waveguide layer and clad layer which assures low transmission loss and is also the most suitable to the patterning because it includes the process to form the amorphous thin film.

The organic metal compound used in the wet process is a reaction by product of various metals and an organic compound, preferably an organic compound having the boiling point under the atmospheric pressure of 80° C. or higher and it is represented by a metal alkoxide and metal salt, but this organic metal compound is never limited thereto. As the organic ligand of metal alkoxide compound, $R_1O$— or $R_2OR_3O$— is selected (in the formula, $R_1$ and $R_2$ define aliphatic hydrocarbon group, while $R_3$ defines bivalent aliphatic hydrocarbon group which may have the ether coupling). Such a metal alkoxide compound can be combined by distillation or reflux in the organic solvent represented by $R_1OH$ or $R_2OR_3OH$ containing metal. As the $R_1$ and $R_2$ aliphatic hydrocarbon group, the alkyl group having the number of carbons of 2 to 4 is desirable and as the $R_3$ aliphatic hydrocarbon group, the alkylene group having the number of carbons of 2 to 4 and the bivalent group having the total number of carbons of 4 to 8 in which alkylene groups having the number of carbons of 2 to 4 are combined through ether coupling is desirable.

In the wet process, these organic compounds are reacted with solvent in the predetermined composition or dissolved into the solvent. Thereafter, these compounds are coated on the substrate. It is also possible to coat the organic metal compound after the hydrolysis but it is preferable that the hydrolysis is never conducted in order to obtain epitaxial ferroelectric thin film. Moreover, reaction with solvent or dissolving to the solvent is desirable to be performed in the dry nitrogen or argon atmosphere from the quality of the obtained thin film.

Preferably, a solvent is selected from alcohols, diketones, ketonic acids, alkylic esthers, oxydic acids, oxyketonic acids and acetic acid having the boiling point of 80° C. or higher under the atmospheric pressure. As the solvent having the boiling point of 80° C. or higher, those which assures easy alcohol exchange reaction of metal alkoxide is preferable for practical use. For example, the alcohols such as $(CH_3)_2CHOH$ (boiling point=82.3° C.), $CH_3(C_2H_5)CHOH$ (boiling point=99.5° C.), $(CH_3)_2CHCH_2OH$ (boiling point= 108° C.), $C_4H_9OH$ (boiling point=117.7° C.), $(CH_3)_2CHC_2H_4OH$ (boiling point=130.5° C.), $CH_3OCH_2CH_2OH$ (boiling point=124.5° C.), $C_2H_5OCH_2CH_2OH$ (boiling point=135° C.) and $C_4H_9OCH_2CH_2OH$ (boiling point=171° C.) are most preferable but these the solvent is never limited thereto and the solvent $C_2H_5OH$ (boiling point=78.3° C.) can also be used.

As the method for coating the organic metal compound solution to the single crystal substrate, the spin coat method, dipping method, splaying method, screen printing method and ink jet method can be listed. These coating methods are more desirable in the quality of thin film than that conducted in the dry nitrogen or argon atmosphere.

After the coating, the substrate is heated as the preprocessing in the oxygen atmosphere, more preferably in the oxygen at the temperature increasing rate of 0.1 to 1000° C./sec, more desirably of 1 to 100° C./sec and the amorphous thin film is formed by thermal decomposition of the coating layer within the temperature range of 100° C. to 500° C., more desirably of 200° C. to 400° C. which does not result in crystallization.

Moreover, the substrate is further heated at a high speed in the atmosphere including oxygen, more preferably in the oxygen atmosphere under the temperature increasing rate of 1 to 500° C./sec, preferably of 10 to 100° C./sec and it is also heated within the temperature range of 500° C. to 1200° C., more preferably of 600° C. to 900° C. to grow the ferroelectric material thin film by solid phase epitaxial growth.

In this epitaxial crystallization, the heat treatment is performed at the above temperature for 1 second to 24 hours, more desirably for 1 seconds to 6 hours. As these oxygen atmosphere, it is desirable from the viewpoint of thin film quality to introduce at least for the constant period the atmosphere including oxygen but it is also necessary to humidify the atmosphere as required. In these epitaxial crystallization process, it is preferable to form the ferroelectric thin film in the thickness of one layer of 10 nm to 1000 nm, desirably in the thickness of 10 nm to 200 nm in the single process by solid phase epitaxial growth and when thickness is large, it is desirable to perform solid phase epitaxial growth in several times. After respective epitaxial growths, cooling is performed preferably at the cooling rate of 0.01 to 100° C./sec.

The upper electrode may be manufactured by the vapor growth method selected from electron beam evaporation, flash evaporation, ion plating, Rf-magnetron sputtering, ion beam sputtering, laser abrasion, MBE, CVD, plasma CVD, MOCVD or the like or by wet processing such as sol-gel method, MOD method or the like. Shape of the upper electrode is adequately selected depending on the type of optical switch and patterning of upper electrode may be performed by the method selected from the wet etching, dry etching and lift-off methods.

In the present invention, the channel optical waveguide of branching type, crossing type, directional coupling type, Mach-Zehnder interference type or the type combining these types and the channel optical waveguide of S-shape type connecting these waveguides, linear type, X crossing type or the type combining these types can be formed in any system of the embedded type, ridge type or rib type which are generally introduced, but in the present invention, the optical waveguide layer is formed by laminating thin films on the substrate. Therefore, when easiness of manufacture is considered, it is desirable to introduce the channel optical waveguide structure in which the projected portion is provided in the optical waveguide layer, channel optical waveguide structure in which the clad layer is provided after the projected portion is formed to the optical waveguide layer or the channel optical waveguide structure in which the optical waveguide layer is provided after providing the recessed portion to the buffer layer.

In the present invention, in view of forming the optical waveguide layer through lamination of thin film on the substrate, it is easily possible to select the optimum values for the width, height or depth of the channel waveguide depending on the switching system of the Mach-Zehnder interference switch, directional coupling switch, total reflection switch, Bragg reflection switch or digital type switch, radius of curvature of bending channel waveguide, material of waveguide and manufacturing process.

Moreover, optical transmission loss can be lowered by providing, as required, the offset between S-shape channel optical waveguides in different curving directions and between the S-shape channel optical waveguide and linear channel optical waveguide.

The patterning between the channel optical waveguides may be performed by the method selected from the wet etching, dry etching and lift-off methods.

In the case of etching the amorphous thin film at the surface of epitaxial thin film by using solid phase epitaxial growth method, etch stop utilizing difference in composition of each layer and crystal property can be implemented easily and only the amorphous thin film at the surface of epitaxial thin film can be patterned by exposing and etching the photoresist or electron beam resist coated on the amorphous thin film surface.

As the etching process, the wet etching by the aqueous solution such HCl, $HNO_3$, HF, $H_2SO_4$, $H_3PO_4$, $C_2H_2O_2$, $NH_4F$ and mixed aqueous solutions thereof, reactive ion etching by the mixed gas of these aqueous solutions and $O_2$ or dry etching such as ion beam etching may be used but easier etching may be realized by the wet etching at a higher etching rate.

Namely, in the present invention, since solid phase epitaxial growth, which can form the amorphous thin film at the surface of epitaxial thin film, is employed, when it is combined with the wet etching, the etching process may be done easily at a higher speed and the etching in the depth direction of channel is stopped at the surface of epitaxial layer but the etching in the width direction of channel is desirable to be individually controlled in the depth and width because the amorphous layer under the mask is under-etched or side-etched.

More practically, it is desirable to form the optical waveguide layer with the methods (1) to (3) explained below.

(1) The epitaxial buffer layer is grown by solid phase epitaxial growth on the lower electrode substrate of single crystal semiconductor, amorphous thin film is then formed as the epitaxial buffer layer, channel shape recessed portion is formed to the amorphous thin film by the wet etching, the recessed portion is heated for solid phase epitaxial growth and the optical waveguide layer is then formed at the upper part thereof by solid phase epitaxial growth.

(2) The epitaxial buffer layer is grown by solid phase epitaxial growth on the lower electrode substrate, the amorphous thin film is then formed as the epitaxial buffer layer, the channel shape recessed portion is formed by the wet etching to the amorphous thin film, the amorphous thin film is formed at the upper part thereof as the optical waveguide layer and it is then heated for solid phase epitaxial growth.

(3) The epitaxial buffer layer is formed on the lower electrode substrate by solid phase epitaxial growth, the epitaxial optical waveguide layer is then grown by solid phase epitaxial growth, the amorphous thin film is formed as the epitaxial optical waveguide layer, the channel shape recessed portion is formed to the amorphous thin film by the wet etching and thereafter it is heated for the purpose of solid phase epitaxial growth.

Moreover, the methods (1) and (2) may be listed as the most desirable methods to process the acute angle portion of the crossing portion of channel waveguide in the ideal shape with excellent control ability at the Y branching or asymmetrical X crossing portion and particularly to manufacture the digital type optical switch.

Moreover, in the method (1), the optical waveguide layer is formed after solid phase epitaxial growth of the amorphous buffer layer in which the channel shape recessed portion is formed, while in the method (2), solid phase epitaxial growth is performed simultaneously to the amorphous buffer layer to which the channel shape recessed portion is formed and the amorphous optical waveguide layer, therefore the recessed portion of buffer layer is exposed to high temperature oxygen only for a short period and smooth surface can be obtained. Therefore, the method (2) is particularly desirable.

The end surface process for the incident and outgoing light beams may be performed by the methods selected from polishing, cutting, cleavage and etching.

The optical device of the present invention can be manufactured by applying the initial voltage of the level for giving the electric field higher than the coercive electric field to the formed channel optical waveguide. As explained above, stable drive may be implemented by applying in advance the initial voltage before the drive without any hysteresis characteristic.

As explained above, the structure in which the optical waveguide is sandwiched by the upper and lower electrodes even with the oxide ferroelectric material can be implemented and low voltage drive can also be implemented without deteriorating the low optical propagation loss characteristic by providing the epitaxial or single orientation buffer layer of high dielectric constant on the conductive or semiconductor single crystal substrate used as the lower electrode, providing thereon the oxide optical waveguide layer having the refractive index higher than that of buffer layer and epitaxial or single orientation electro-optic effect, then providing thereon as required the clad layer having the refractive index smaller than that of the optical waveguide and high dielectric constant and further providing thereon the upper electrode.

Moreover, since the refractive index of substrate, buffer layer and optical waveguide layer can be selected in a wider range in comparison with the material and structure of the related art and various shapes of channel can be manufactured easily because of use of optical waveguide layer, a difference between the effective refractive index of the channel optical waveguide and that of the peripheral area can be designed in the wider range and the radius of curvature of the bending channel coupling the branching type, crossing type or directional coupling channel optical waveguide can be set small while controlling the radiation loss as required. Accordingly, a large size matrix optical switch can be manufactured even under the usually desired 5V drive condition.

Moreover, in the present invention, in view of overcoming the hysteresis characteristic of the oxide ferroelectric material used for the optical waveguide layer, a voltage of the same polarity as the initial voltage is applied for drive after the single pole initial voltage is applied to the channel optical waveguide from the upper electrode. Thereby, excellent operation of optical device can be realized without generation of hysteresis characteristic.

Moreover, using inversely the hysteresis characteristic of the oxide ferroelectric material, the optical device can be driven utilizing the first characteristic obtained when the single polarity voltage is applied to one channel of the branching channel optical waveguide and it is then reduced to zero and the second characteristic different from the first characteristic obtained when the voltage of the inverse polarity to the single polarity voltage is applied to the other channel and it is then reduced to zero. Owing to this method, even if the optical device is isolated from the power supply, the refractive index difference required for drive of optical device may be maintained between the channels. Accordingly, not only the use of device as the memory using this function can be realized but also the power consumption required for drive of optical device can be remarkably reduced.

According to the present invention, the waveguide type optical switch having the function to switch the optical path of optical fiber can be manufactured in the compact size and thereby a large size matrix optical switch can also be structured. Moreover, the present invention can provide an optical switch which assures small crosstalk and insertion loss, implements stable and high speed switching of ports with an adequate interval with a low drive voltage and also assures temperature stability.

Moreover, the present invention provides a driving method of optical device for obtaining stable drive characteristic without any hysteresis characteristic and a driving method of optical device for driving the device by storing the predetermined condition by utilizing the hysteresis characteristic.

In addition, the present invention provides a manufacturing method to manufacture the optical device of the present invention with excellent accuracy.

What is claimed is:

1. An optical device, comprising:
    an epitaxial or single orientation optical waveguide layer provided with a channel optical waveguide including an oxide ferroelectric material having an electro-optic effect; and
    an electrode including an upper electrode and a lower electrode that apply a voltage to the channel optical waveguide, wherein the lower electrode includes a single crystal substrate.

2. The optical device as claimed in claim 1, wherein the oxide ferroelectric material is formed of non-linear material which shows a hysteresis characteristic in its changing characteristic of a refractive index for a voltage and has different characteristics when a single polarity voltage is applied to the channel optical waveguide and it is then reduced to zero and when a voltage of inverse polarity to the single polarity voltage is applied to the channel optical waveguide and it is thereafter reduced to zero.

3. The optical device as claimed in claim 1, wherein the oxide ferroelectric material is $Pb_{1-x}La_x(Zr_yTi_{1-y})_{1-x/4}O_3$ (0<x<0.3, 0<y<1.0).

4. The optical device as claimed in claim 1, further comprising:
    a layer formed on a lower surface of the optical waveguide layer,
    wherein the channel optical waveguide has a portion projecting toward the layer.

5. The optical device as claimed in claim 1, further comprising:
    a layer formed on an upper surface of the optical waveguide layer,
    wherein the channel optical waveguide has a portion on projecting toward the layer.

6. The optical device as claimed in claim 1, wherein a clad layer which is formed of an oxide and has a refractive index smaller than that of the optical waveguide layer is provided between the optical waveguide layer and the upper electrode.

7. The optical device as claimed in claim 6, wherein the clad layer is formed of $Pb_{1-x}La_x(Zr_yTi_{1-y})_{1-x/4}O_3$ (0<x<0.3, 0<y<1.0).

8. A matrix type optical device, comprising:
    a plurality of optical devices as claimed in claim 1 arranged in a matrix on a substrate.

9. A driving method of the optical device as claimed in claim 1, wherein after a single polarity initial voltage is applied to the channel optical waveguide from the upper electrode, a voltage of the same polarity as the initial voltage is applied for driving the device.

10. A driving method of the optical device as claimed in claim 9, wherein the initial voltage is the voltage which can give an electric field higher than a coercive electric field to the channel optical waveguide.

11. A driving method of the optical device as claimed in claim 1, wherein the device is driven by utilizing a first characteristic obtained when a single polarity voltage is applied to the channel optical waveguide and this voltage is thereafter reduced to zero and a second characteristic different from the first characteristic obtained when a voltage of inverse polarity to the single polarity voltage is applied to the channel optical waveguide and this voltage is thereafter reduced to zero.

12. A driving method of the optical device as claimed in claim 11, wherein the voltage which is enough to give an electric field higher than a coercive electric field is applied to the channel optical waveguide.

13. A manufacturing method of the optical device as claimed in claim 1, wherein the optical waveguide layer is formed through solid phase epitaxial growth by heating an amorphous thin film.

14. A manufacturing method of the optical device as claimed in claim 1, wherein the channel optical waveguide is formed by the process comprising the steps of:
    forming an amorphous buffer layer comprising an amorphous thin film;
    removing a part of the amorphous buffer layer to be the channel optical waveguide by etching;
    forming an epitaxial or single orientation buffer layer through solid phase epitaxial growth by heating the amorphous buffer layer;
    forming an amorphous optical waveguide layer comprising an amorphous thin film on the epitaxial or single orientation buffer layer; and
    forming an epitaxial or single orientation optical waveguide layer through solid phase epitaxial growth by heating the amorphous optical waveguide layer.

15. The manufacturing method claimed in claim 14, wherein the etching is wet etching.

16. The manufacturing method claimed in claim 14, wherein the amorphous thin film is formed by coating an organic metal compound solution.

17. The manufacturing method as claimed in claim 14, wherein an optical device is manufactured by applying an initial voltage in the amplitude for giving an electric field higher than a coercive electric field to the formed channel optical waveguide.

18. A manufacturing method of the optical device as claimed in claim 1, wherein the channel optical waveguide is formed by the process comprising the steps of:
    forming an amorphous buffer layer comprising an amorphous thin film;
    removing a part of the amorphous buffer layer to be the channel optical waveguide by etching;
    forming an amorphous optical waveguide layer comprising an amorphous thin film on the amorphous buffer layer; and
    forming an epitaxial or single orientation optical waveguide layer through solid phase epitaxial growth by heating the amorphous buffer layer and the amorphous optical waveguide layer.

19. A manufacturing method of the optical device as claimed in claim 1, wherein the channel optical waveguide is formed by the process comprising the steps of:
    forming an amorphous optical waveguide layer comprising an amorphous thin film on an epitaxial or single orientation buffer layer;
    forming a projecting portion to be the channel optical waveguide on the amorphous optical waveguide layer by etching; and
    forming an epitaxial or single orientation optical waveguide layer through solid phase epitaxial growth by heating the projecting portion.

20. The optical device, comprising:
    a single crystal substrate which is used as a conductive or semiconductive lower electrode or a single crystal substrate on a surface of which a conductive or semiconductive thin film is provided as a lower electrode;
    an epitaxial or single orientation buffer layer provided on the crystal substrate, the buffer layer comprising an oxide;
    an epitaxial or single orientation optical waveguide layer formed of oxide ferroelectric material having an electro-optic effect which is formed on the buffer layer and provided with a channel optical waveguide, switching between optical paths for an incident light beam and an outgoing light beam of the channel optical waveguide being performed by applying a voltage to a branching portion of the paths; and
    a pair of upper electrodes that applies a voltage to the branching portion of the optical paths of the channel optical waveguide.

21. The optical device as claimed in claim 20, wherein the oxide ferroelectric material is non-linear material which shows a hysteresis characteristic in its changing characteristic of a refractive index for a voltage and has different characteristics when a single polarity voltage is applied to the channel optical waveguide and it is then reduced to zero and when a voltage of inverse polarity to the single polarity voltage is applied to the channel optical waveguide and it is thereafter reduced to zero.

22. The optical device as claimed in claim 20, wherein the buffer layer and optical waveguide layer are formed of $Pb_{1-x}La_x(Zr_yTi_{1-y})_{1-x/4}O_3$ ($0<x<0.3$, $0<y<1.0$).

23. The optical device as claimed in claim 20, wherein the optical waveguide layer has a refractive index larger than that of the buffer layer.

24. The optical device as claimed in claim 20, wherein the single crystal substrate which is used as the conductive or semiconductive lower electrode is $SrTiO_3$ doped with an impurity element.

25. The optical device as claimed in claim 20, wherein the conductive or semiconductive thin film provided on the single crystal substrate which is used as the lower electrode is an epitaxial or single orientation thin film.

26. The optical device as claimed in claim 20, wherein the channel optical waveguide is a Y branching type optical waveguide and the upper electrode is provided to control the switching between the optical paths by applying a voltage to the branching portion, thus allowing the optical device to serve as a digital type switch.

27. The optical device as claimed in claim 20, wherein the channel optical waveguide is an X branching type optical waveguide and the upper electrode is provided to control switching between the optical paths by applying a voltage to the branching portion, thus allowing the optical device to serve as a digital type switch.

28. The optical device as claimed in claim 20, wherein the channel optical waveguide is an X crossing type optical waveguide and the upper electrode is provided to control the switching between the optical paths by applying a voltage to the branching portion, thus allowing the optical device to serve as a total reflection type switch or Bragg reflection type switch.

29. The optical device as claimed in claim 20, wherein the channel optical waveguide comprises the plurality of optical waveguides constituting a directional coupler, and the upper electrode is provided to control switching among the optical paths in the plurality of optical waveguides by applying a voltage to the branching portions, thus allowing the optical device to serve as a directional coupler type switch.

30. The optical device as claimed in claim 20, wherein the channel optical waveguide is a Mach-Zehnder interference type optical waveguide and the upper electrode is provided to control Switching between the optical paths by applying a voltage to the branching portion, thus allowing the optical device to serve as a Mach-Zehnder interference type switch.

31. A manufacturing method of the optical device as claimed in claim 20, wherein the buffer layer and the optical waveguide layer can be formed through solid phase epitaxial growth by heating an amorphous thin film.

32. A manufacturing method of an optical device, wherein a channel optical waveguide of the optical device is formed by the process comprising the steps of:

forming an amorphous buffer layer comprising an amorphous thin film;

removing a part of the amorphous buffer layer to be the channel optical waveguide by etching;

forming an epitaxial or single orientation buffer layer through solid phase epitaxial growth by heating the amorphous buffer layer;

forming an amorphous optical waveguide layer comprising an amorphous thin film formed of an oxide ferroelectric material having an electro-optic effect on the epitaxial or single orientation buffer layer; and forming an epitaxial or single orientation optical waveguide layer through solid phase epitaxial growth by heating the amorphous optical waveguide layer.

33. A manufacturing method of an optical device, wherein a channel optical waveguide of the optical device is formed by the process comprising the steps of:

forming an amorphous buffer layer comprising an amorphous thin film;

removing a part of the amorphous buffer layer to be the channel optical waveguide by etching;

forming an amorphous optical waveguide layer comprising an amorphous thin film formed of an oxide ferroelectric material having an electro-optic effect on the amorphous buffer layer; and forming an epitaxial or single orientation optical waveguide layer through solid phase epitaxial growth by heating the amorphous buffer layer and the amorphous optical waveguide layer.

34. A manufacturing method of an optical device, wherein an channel optical waveguide of the optical device is formed by the process comprising the steps of:

forming an amorphous optical waveguide layer comprising an amorphous thin film formed of an oxide ferroelectric material having an electro-optic effect on an epitaxial or single orientation buffer layer;

forming a projecting portion to be the channel optical waveguide on the amorphous optical waveguide layer by etching; and forming an epitaxial or single orientation optical waveguide layer through solid phase epitaxial growth by heating the projecting portion.

35. An optical device comprising:

an epitaxial or single orientation optical waveguide layer formed of an oxide ferroelectric material having an electro-optic effect and provided with a channel optical waveguide; and an electrode that applies a voltage to the channel optical waveguide, wherein the electrode includes a single crystal substrate, wherein the oxide ferroelectric material is formed of a non-linear material which shows a hysteresis characteristic in its changing characteristic of a refractive index for the voltage and has different characteristics obtained when a single polarity voltage is applied to the channel optical waveguide and the voltage is thereafter reduced to zero and when a voltage of inverse polarity to the single polarity voltage is applied to the channel optical waveguide and the voltage is thereafter reduced to zero.

\* \* \* \* \*